(12) United States Patent
Hirano

(10) Patent No.: US 10,353,788 B2
(45) Date of Patent: Jul. 16, 2019

(54) PROCESSING METHOD, COMMUNICATION SYSTEM, AND RECORDING MEDIUM

(71) Applicant: FUJITSU LIMITED, Kawasaki-shi, Kanagawa (JP)

(72) Inventor: Yuki Hirano, Kahoku (JP)

(73) Assignee: FUJITSU LIMITED, Kawasaki (JP)

( * ) Notice: Subject to any disclaimer, the term of this patent is extended or adjusted under 35 U.S.C. 154(b) by 148 days.

(21) Appl. No.: 15/623,744

(22) Filed: Jun. 15, 2017

(65) Prior Publication Data
US 2018/0004618 A1 Jan. 4, 2018

(30) Foreign Application Priority Data

Jun. 29, 2016 (JP) ................................. 2016-128563

(51) Int. Cl.
| | |
|---|---|
| *G06F 11/00* | (2006.01) |
| *G06F 11/22* | (2006.01) |
| *H04L 12/24* | (2006.01) |
| *G06F 13/40* | (2006.01) |
| *G06F 13/42* | (2006.01) |

(52) U.S. Cl.
CPC ........ *G06F 11/221* (2013.01); *G06F 11/2268* (2013.01); *H04L 41/08* (2013.01); *H04L 41/0803* (2013.01); *G06F 13/4022* (2013.01); *G06F 13/4282* (2013.01); *G06F 2213/0026* (2013.01)

(58) Field of Classification Search
CPC .... G06F 11/221; G06F 11/2268; G06F 11/22; G06F 11/2205; G06F 13/4022; G06F 13/4282; G06F 13/4265; G06F 2213/0026; H04L 41/08; H04L 41/0803; H04L 25/0242; H04L 27/2646
See application file for complete search history.

(56) References Cited

FOREIGN PATENT DOCUMENTS

| JP | 9-331372 | | 12/1997 |
|---|---|---|---|
| JP | 09331372 A | * | 12/1997 |
| JP | 2005-339983 | | 12/2005 |
| JP | 2008-42851 | | 2/2008 |
| JP | 2008042851 A | * | 2/2008 |
| JP | 2014-2637 | | 1/2014 |
| JP | 2014002637 A | * | 1/2014 |

* cited by examiner

*Primary Examiner* — Anthony J Amoroso
(74) *Attorney, Agent, or Firm* — Fujitsu Patent Center

(57) ABSTRACT

A processing method executed by a processor included in a first communication device, the method includes outputting, from a first communication interface of the first communication device, a plurality of data items to a communication path between the first communication interface and a second communication interface of the second communication device while changing a communication setting value regarding the first communication interface; acquiring error information related to the outputting; storing the acquired error information as error management information acquired by associating the communication setting value with the error information; specifying a predetermined number of continuous communication setting values at which an error is not detected based on the error management information; setting a target setting value of the specified communication setting values for the first communication interface; and executing a communication process between the first communication interface for which the target setting value is set and the second communication interface.

10 Claims, 9 Drawing Sheets

PROCESSING METHOD, COMMUNICATION SYSTEM, AND RECORDING MEDIUM

CROSS-REFERENCE TO RELATED APPLICATIONS

This application is based upon and claims the benefit of priority of the prior Japanese Patent Application No. 2016-128563, filed on Jun. 29, 2016, the entire contents of which are incorporated herein by reference.

FIELD

The embodiments discussed herein are related to a processing method, a communication system, and a recording medium.

BACKGROUND

Recently, most chipsets have peripheral component interconnect express (PCIe) buses for high-speed data transmission. There are many cases where a redundant arrays of inexpensive disks (RAID) device includes a plurality of units. The units are connected by a midplane, a backplane, and a cable.

Housings are primarily connected by a cable. The type or length of the cable used in the connection between the housings is to be flexibly changed or selected depending on various conditions such as the scale-out number of the devices or an installation place.

Meanwhile, a characteristic difference due to the material, length, and type of the cable greatly influences the transmission quality of data. Thus, combinations of input and output settings of a PCIe switch with transmission characteristics of the cable are to be verified, and an optimum combination is to be previously selected. If an optimum value is not selected, there is a high possibility that a communication error will occur.

In general, the device (PCIe switch) that supports PCIe Gen3 has a function of automatically adjusting (auto-tuning) a setting value (waveform adjustment value) regarding a transmission waveform. The automatic adjustment is interactively performed between the devices.

In such an automatic adjustment, a value which falls within a prescribed value of an error rate and is capable of being linked up by PCIe is selected as a setting value. For example, Japanese Laid-open Patent Publication No. 9-331372, Japanese Laid-open Patent Publication No. 2008-42851, and Japanese Laid-open Patent Publication No. 2014-2637 are disclosed as related arts.

However, in an automatic setting method of setting an input and output setting value of the PCIe device of the related art stated above, a setting value determined through automatic setting at which an error rate approximates the prescribed value may be selected. That is, even though the setting value at which the error rate approximates the prescribed value is selected, it is determined that there is no problem in the transmission quality at the setting value, and connection is established in the device by using the setting value.

Accordingly, when an environment condition such as temperature or voltage is changed, since the device is not able to endure the environment change at the setting value at which the error rate approximates the prescribed value, there is a problem that a communication error occurs.

Thus, the cable used in the connection between the devices is limited, and a setting value prepared as an eigenvalue appropriated for the cable is set. However, in a case where the available cable is limited, a long cable is used even in the connection between adjacent devices, and thus, flexibility of the configuration using the communication cable is low, and there is a problem of inconvenience. In view of the foregoing, it is desirable that the likelihood of a transmission error occurring is low and communication quality is improved.

SUMMARY

According to an aspect of the invention, a processing method executed by a processor included in a first communication device coupled to a second communication device, the processing method includes outputting, from a first communication interface of the first communication device, a plurality of data items to a communication path between the first communication interface and a second communication interface of the second communication device while changing a communication setting value regarding the first communication interface; acquiring error information related to the outputting of the plurality of data items; storing the acquired error information as error management information acquired by associating the communication setting value with the error information; specifying a predetermined number of continuous communication setting values at which an error is not detected based on the error management information; setting a target setting value of the specified communication setting values for the first communication interface; and executing a communication process between the first communication interface for which the target setting value is set and the second communication interface.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Figure 1:
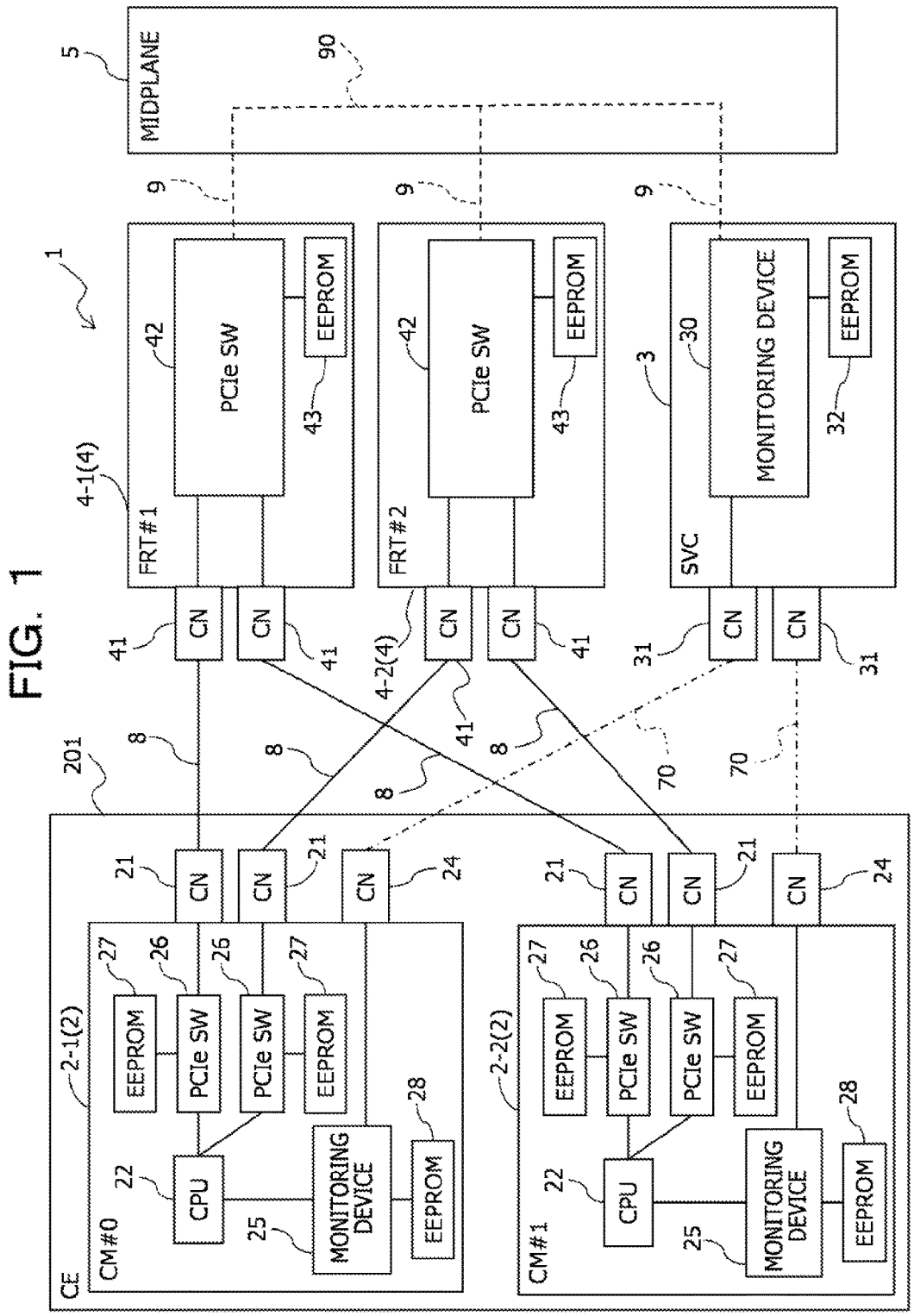
FIG. 1 is a diagram illustrating an example of a cable connection configuration of a storage device.

Hereinafter, an embodiment of a communication system, a control device, and a control program will be described with reference to the drawings. The embodiment illustrated in the following description is merely an example, and is not intended to exclude various modification examples or technologies that are not described in the embodiment. That is, the present embodiment may be variously modified without departing from the gist thereof. The respective drawings are not intended to include only components illustrated in the drawings, and may include other functions.

(a) Configuration

FIG. 1 is a diagram illustrating an example of a cable connection configuration of a storage device 1.

As illustrated in FIG. 1, the storage device 1 includes a service controller (hereinafter, referred to as an SVC) 3, a midplane 5, a plurality (two controller modules are illustrated in FIG. 1) of controller modules (hereinafter, referred to as CMs) 2-1 and 2-2, and a plurality (two front-end routers are illustrated in FIG. 1) of front-end routers (hereinafter, referred to as FRTs) 4-1 and 4-2.

The SVC 3, CMs 2, and FRTs 4 constitute a communication system in which these components are able to communicate with each other.

Hereinafter, an example in which the plurality of CMs 2-1 and 2-2 and the plurality of FRTs 4-1 and 4-2 are connected through PCIe communication cables 8 in the storage device 1 will be described. For example, various cables such as an optical cable or a copper (Cu) cable may be used as the communication cable 8.

The midplane 5 is a circuit board device that performs data communication between devices. The midplane 5 includes a plurality of connectors (not illustrated). The midplane 5 performs bus communication between devices connected to these connectors.

In the example illustrated in FIG. 1, the SVC 3 and two FRTs 4-1 and 4-2 are connected to the midplane 5.

The FRTs 4-1 and 4-2 are communication devices that realize communication (CM-to-CM communication) between the plurality of CMs 2-1 and 2-2. The FRTs 4-1 and 4-2 have the same configuration.

Hereinafter, the FRT 4-1 may be referred to as a FRT #0. Similarly, the FRT 4-2 may be referred to as a FRT #1.

Hereinafter, reference numerals 4-1, 4-2, #0, and #1 are used as the reference numerals assigned to the FRTs when one of the plurality of FRTs is to be specified. However, reference numeral 4 is used when an arbitrary FRT is indicated.

Hereinafter, the CM 2-1 may be referred to as a CM #0. Similarly, the CM 2-2 may be referred to as a CM #1.

Hereinafter, reference numerals 2-1, 2-2, #0, and #1 are used as the reference numerals assigned to the CMs when one of the plurality of CMs is to be specified. However, reference numeral 2 is used when an arbitrary CM is indicated.

[1] FRT

The FRT 4 includes PCIe switch (PCIe SW) 42, a plurality (for example, 24) of connectors (first connectors) 41, and an electrically erasable programmable read-only memory (EEPROM) 43. For the sake of convenience, only some connectors 41 of each FRT 4 are illustrated in FIG. 1.

A connector (not illustrated) attached to one end of the PCIe communication cable (hereinafter, simply referred to as a communication cable) 8 is detachably mounted on the connector 41. For example, in a case where the connector of the communication cable 8 is a male connector, the connector 41 is a female connector.

A connector (not illustrated) attached to the other end of the communication cable 8 is mounted on a connector 21 of the CM 2-1 or 2-2 to be described below.

Hereinafter, the connector of the communication cable 8 being attached to the connector 41 or the connector 21 may be referred to as being mounted.

The respective FRTs 4 are connected to all the CM 2 through the communication cables 8. That is, the respective CMs 2 are connected to all the FRTs 4 through the communication cables 8.

Read-only memories (ROMs) that store information regarding a cable type and the same serial number (S/N) as identification information are provided in the connectors of the both ends of the communication cable 8. The FRT 4 or the CM 2 may read the information regarding the cable type or the serial number from the ROM and may recognize the read information. The details of the information regarding the cable type will be described below.

Hereinafter, whether or not the mounting is performed may be referred to as a mount state. Information indicating the mount state of the communication cable 8 on the connector 41 may be referred to as mount state information.

The PCIe switch 42 is a circuit device (second communication interface) that switches a data communication path. The PCIe switch 42 outputs data input to the connector 41 from another connector 41 depending on a data transmission destination (communication partner).

The PCIe switch 42 includes a register (not illustrated). The number of times (error number) errors occur in communication performed through the communication cables 8 is stored in the register. That is, the PCIe switch 42 functions as a counter that counts the number of (error number) errors occurring in data communication performed through the communication cables 8.

The EEPROM 43 is a non-volatile memory. A setting value for causing the PCIe switch 42 to function is stored in the EEPROM 43. A waveform adjustment value (communication setting value; hereinafter, simply referred to as a setting value) to be set by a monitoring device 30 (setting value determination unit 358) of the SVC 3 to be described below is stored in the EEPROM 43.

The PCIe switch 42 includes a memory (not illustrated). The PCIe switch 42 stores the waveform adjustment value (communication setting value) read from the EEPROM 43 in this memory. The waveform adjustment value will be described below.

The respective FRTs 4 are connected to the SVC 3 through data buses 9 and the midplane 5. Hereinafter, a data communication path that connects the respective FRTs 4 and the SVC 3 through the data buses 9 and the midplane 5 may be referred to as a first data bus 90.

[2] CM

The CM 2 performs various control tasks of the storage device 1. The CM 2 performs various control tasks such as access control to a storage device (not illustrated) such as a hard disk drive (HDD) in response to a storage access request from a storage device (not illustrated). The respective CMs 2 have the same configuration. The respective CMs 2 are stored in a controller enclosure (CE) 201.

The CM 2 realizes a cable adjustment function (waveform adjusting function) of setting the waveform adjustment value (setting value) corresponding to the communication cable 8 that connects the CM 2 and the FRT 4 in cooperation with the SVC 3 to be described below.

The CM 2 illustrated in FIG. 1 includes a CPU 22, a connector 24, a monitoring device 25, and an EEPROM 28. The CM 2 includes a plurality (two in the example illustrated in FIG. 1) of connectors 21, PCIe switches 26, and EEPROMs 27.

A connector of one end of the communication cable 8 is detachably mounted on the connector 21. For example, in a case where the connector of the communication cable 8 is a male connector, the connector 21 is a female connector.

A connector of the other end of the communication cable 8 is mounted on the connector 41 of the FRT 4 to be described below. The respective CMs 2 are connected to all the FRTs 4 through the communication cables 8.

One end of a monitoring interface cable 70 is detachably mounted on the connector 24. The other end of the monitoring interface cable 70 is mounted on a connector 31 provided at the SVC 3 to be described below. Accordingly, the CM 2 is communicatively connected to the SVC 3 through the monitoring interface cable 70.

The PCIe switches 26 are respectively connected to the connectors 21. The PCIe switch 26 may be an NT PCIe switch that includes a non-transparent bridge capable of causing requests from a plurality of host devices to be regarded as a request from one host device.

The EEPROM 27 is included in each PCIe switch 26. The EEPROM 27 is a non-volatile memory. Setting values for causing the PCIe switches 26 to function are stored in the EEPROMs 27. Waveform adjustment values (communication setting information or setting value) to be set by a monitoring device 25 (setting value determination unit 258) of the CM 2 to be described below are stored in the EEPROMs 27. The EEPROM 27 may be referred to as an external EEPROM 27.

In order to demonstrate the capabilities of the communication cable 8, waveform adjustment is to be performed depending on, for example, a cable type or a cable length of the communication cable 8. The waveform adjustment value is a setting value for performing the waveform adjustment. For example, the waveform adjustment value is associated with control values of an output voltage, an output pre-emphasis, and an input equalizer.

The values of the output voltage, the output pre-emphasis, and the input equalizer are appropriately adjusted, and thus, it is possible to realize high-quality communication without attenuation by using the communication cable 8.

For example, values acquired by expressing the values of the output voltage, the output pre-emphasis, and the input equalizer as hexadecimal values are respectively registered as the waveform adjustment values. These values indicate storing locations (for example, addresses) of other storage areas (not illustrated) such as a register. Actual setting values (waveform adjustment values) as the output voltage, the output pre-emphasis, and the input equalizer are registered in these storage areas.

The waveform adjustment values are set by an auto-tuning function at the time of the activation of the present storage device 1. The setting of the waveform adjustment values using the auto-tuning function is realized by a known method, and the description thereof will be omitted.

The waveform adjustment value is not limited to the above-described information, and may be variously modified. For example, the waveform adjustment value may store information other than the above-described output voltage, output pre-emphasis, and input equalizer, or may remove some of the above-described output voltage, output pre-emphasis, and input equalizer. As the waveform adjustment value, the waveform adjustment value may be directly stored instead of storing locations of other storing areas (not illustrated).

In order to reflect the waveform adjustment values stored in the EEPROM 27 on the operation of the PCIe switch 26, after the waveform adjustment values are stored (updated) in the EEPROM 27, a port of the PCIe switch 26 is reset.

Similarly to the PCIe switch 42, the PCIe switch 26 also includes a register (not illustrated). The number of times (error number) errors occur in communication performed through the communication cables 8 is stored in the register. That is, the PCIe switch 42 functions as a counter that counts the number of (error number) of errors occurring in data communication performed through the communication cables 8.

The EEPROM 28 is a non-volatile memory. In order to investigate the transmission quality of the communication path between the CM 2 and the FRT 4, test pattern data (test pattern) transmitted from the CM 2 to the FRT 4 through the communication cable 8 is stored in the EEPROM 28. Various test data items to be used in testing a transmission path may be used as the test pattern. The EEPROM 28 may be referred to as an external EEPROM 28.

The CPU 22 is a processing device that performs various control tasks and operations. The CPU 22 realizes various functions of the CM 2 such as management and realization of RAID and data access control for the storage device by executing an OS or a program stored in a memory (not illustrated).

The monitoring device 25 is connected to the CPU 22 within the same CM 2 through a data bus. The monitoring device 25 monitors a connection state of the communication cable 8 and each connector 21, and reads the information regarding the cable type or the identification information of the communication cable 8 from the ROM of the connected communication cable 8.

The monitoring device 25 realizes a setting value determination function of determining a setting value for the communication cable 8 connected to the present storage device 1.

When the setting value determination function is realized, the monitoring device 25 performs a communication path test for transmitting the test pattern (test data) to the communication path via the communication cable 8.

In the communication path test, an error log (error number or error rate) is accumulated by transmitting and receiving the test pattern while changing the setting values of the PCIe switch 26 and the PCIe switch 42 between the CM 2 and the FRT 4.

The error log is recorded and managed together with the setting values of the PCIe switch 26 and the PCIe switch 42 used in the transmission and reception of the test pattern in both the monitoring device 25 of the CM 2 and the monitoring device 30 of the SVC 3.

In a case where a communication path test in a transmission direction (hereinafter, may be referred to as "CM→FRT") of data from the CM 2 to the FRT 4 is performed, the monitoring device 25 of the CM 2 repeatedly transmits the test pattern while changing the setting value on a transmission side of the PCIe switch 26.

Figures 2A, 2B:
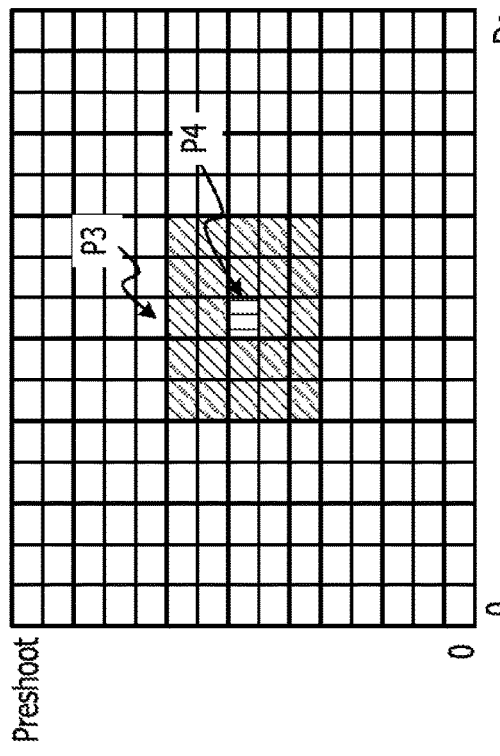
FIGS. 2A and 2B are diagrams illustrating an example of a setting value matrix of the storage device.

Specifically, the monitoring device 25 sequentially sets the setting values represented by a matrix (setting value matrix 100*b*) of setting values illustrated in FIG. 2B for the PCIe switch 26, and transmits the test pattern. As stated above, the monitoring device 25 has a communication path test function.

In a case where a communication path test in a transmission direction (hereinafter, may be referred to as "FRT→CM") of data from the FRT 4 to the CM 2 is performed, the monitoring device 25 of the CM 2 repeatedly receives the test pattern while changing the setting value on a reception side of the PCIe switch 26.

Specifically, the monitoring device 25 sequentially sets the setting values represented by a matrix (setting value matrix 100a) of setting values illustrated in FIG. 2A for the PCIe switch 26, and receives the test pattern.

Meanwhile, in the FRT 4, in a case where the communication path test in the transmission direction (CM→FRT) of the data from the CM 2 to the FRT 4 is performed, the monitoring device 30 repeatedly receives the test pattern while changing the setting value on a reception side of the PCIe switch 42.

Specifically, the monitoring device 30 sequentially sets the setting values represented by the matrix (setting value matrix 100a: see FIG. 2A) of setting values illustrated in FIG. 2A for the PCIe switch 42, and receives the test pattern.

In a case where the communication path test in the transmission direction (FRT→CM) of the data from the FRT 4 to the CM 2 is performed, the monitoring device 30 repeatedly transmits the test pattern while changing the setting value on a transmission side of the PCIe switch 42.

Specifically, the monitoring device 30 sequentially sets the setting values represented by the matrix (setting value matrix 100b: see FIG. 2B) of setting values illustrated in FIG. 2B for the PCIe switch 42, and transmits the test pattern.

The monitoring device 25 has an error check function of checking the error numbers of errors detected in the PCIe switch 26 and the PCIe switch 42, as the results of the communication path tests.

The monitoring device 30 of the SVC 3 to be described below notifies the monitoring device 25 of the CM 2 of the error numbers detected when the PCIe switch 42 of the FRT 4 receives the test pattern in the communication path test together with the setting value set for the reception side of the PCIe switch 42.

The monitoring device 30 notifies the monitoring device 25 of the CM 2 of the setting value of the PCIe switch 42 used when the PCIe switch 42 of the FRT 4 transmits the test pattern in the communication path test.

As for the communication path test in the transmission direction (CM→FRT) of the data from the CM 2 to the FRT 4, the monitoring device 25 associates the setting value on the transmission side set for the PCIe switch 26 with the error number and the setting value on the reception side of the PCIe switch 42 notified from the monitoring device 30, and records the associated information as error management information in a PCIe switch setting value determination table 257.

As for the communication path test in the transmission direction (FRT→CM) of the data from the FRT 4 to the CM 2, the monitoring device 25 associates with the detected error number and the setting value on the reception side set for the PCIe switch 26 with the setting value on the transmission side of the PCIe switch 42 notified from the monitoring device 30, and records the associated information in the PCIe switch setting value determination table 257.

As stated above, the monitoring device 25 associates combinations of the PCIe switches 26 and the PCIe switches 42 constituting target communication paths of the communication path test with combinations of the setting values on the transmission side and the setting values on the reception side which are sequentially changed, and records the error numbers detected in the transmission and reception of the test pattern (communication path test log collection function).

The monitoring device 25 specifies a predetermined range (non-error setting value group) in which setting values having no error are continued from the matrix (setting value matrices 100a and 100b) of setting values. The monitoring device 25 selects a value (middle value) in the middle of the non-error setting value group, as a setting value. That is, the monitoring device 25 has a setting value determination function of determining the setting value.

FIGS. 2A and 2B are diagrams illustrating examples of the setting value matrix of the storage device 1. FIG. 2A denotes the setting value matrix 100a to be used at the time of data reception. FIG. 2B denotes the setting value matrix 100b to be used at the time of data transmission.

As denoted in FIG. 2A, the setting value matrix 100a is constituted by combinations of a plurality of gradually changing decision feedback equalizer (DFE) values (transmission parameters) and a plurality of gradually changing continuous time linear equalizer (CTLE) values (transmission parameters). That is, in the setting value matrix 100a illustrated in FIG. 2A, individual squares constituted by combinations of the CTLE values arranged in the horizontal direction and the DFE values arranged in the vertical direction respectively represent the setting values.

In the setting value matrix 100a, a pitch width of the CTLE in the horizontal direction and a pitch width of the DFE in the vertical direction may be appropriately modified.

The setting value matrix 100a illustrated in FIG. 2A is constituted by arranging 15 types of CTLE values in the horizontal direction in ascending order and arranging 15 types of DFE values in the vertical direction in ascending order, as a lower left location with an origin.

In general, in order to compensate for a deterioration (attenuation) in signal quality with high-speed transmission, a device that supports PCIe Gen3 includes equalizer blocks on a reception side and a output side.

The DFE is an equalizer that compensates for waveform distortion according to the data pattern, and is generally disposed at a subsequent stage of the CTLE. The CTLE is an equalizer that amplifies a signal in order to compensate for signal intensity attenuated in the data transmission path, and is generally disposed at a previous state of the DFE.

On the reception side, the waveform is adjusted by adjusting the parameters of the DFEs and the CTLEs. The combinations of the DFEs and the CTLEs are used as the setting values (waveform adjustment values).

As depicted in FIG. 2A, the values of the plurality of types of DFEs and the values of the plurality of types of CTLEs are arranged in a matrix shape in the present storage device 1. The setting value determination unit 258 (see FIG. 3) selects the combination of the DFE and the CTLE to be used as the setting value from the matrix.

Specifically, the monitoring device 25 sets the combinations of the DFEs and the CTLEs represented in the matrix shape depicted in FIG. 2A, as the actual setting values, for the PCIe switch 26, and performs the communication path test for actually receiving the test pattern in advance.

In the PCIe switch 26, if an error occurs at the time of the data reception from the FRT 4 or at the time of the data transmission to the FRT 4, the result (error number; error information) is stored in a register (not illustrated).

Hereinafter, the error number detected when the data communication is performed in a state in which the setting value (waveform adjustment value) is set for the PCIe switch 26 or the PCIe switch 42 may be expressed as the error number of the setting value. For example, in a case where the error is not detected as a result being acquired by setting a certain setting value for the PCIe switch 26 to perform the transmission and reception of the test pattern, the error number of the setting value may be expressed as error number of setting value=0.

In the error check function of the present storage device 1, the error numbers as the results of the communication path tests from the registers of the PCIe switch 26 and the PCIe switch 42 are collected, and whether or not the errors occur (error numbers) at the setting values is determined. The determined information is in the PCIe switch setting value determination table 257 (see FIG. 3) to be described below.

The PCIe switch setting value determination table 257 is management information (error management information) managed by associating the error number detected in the setting value at the time of the transmission of the test pattern of the communication path test with the setting values constituting the setting value matrix.

For example, the PCIe switch setting value determination table 257 associates the setting values of the PCIe switches 26 (42) on the transmission side and the setting values of the PCIe switches 42 (26) on the reception side in the FRT→CM direction and the CM→FRT direction and the detected error numbers with the combinations of the PCIe switches 26 and the PCIe switches 42 constituting the communication path.

As for the communication path test in the transmission direction (CM→FRT) of the data from the CM 2 to the FRT 4, a test controller 254 associates the setting values on the transmission side of the PCIe switches 26 acquired through a PCIe switch setting value interface 253, the setting values on the reception side of the PCIe switches 42 notified from the monitoring device 30, and the error numbers, and records the associated information in the PCIe switch setting value determination table 257.

As for the communication path test in the transmission direction (FRT→CM) of the data from the FRT 4 to the CM 2, the test controller 254 associates the setting values on the reception side of the PCIe switches 26 acquired through the PCIe switch setting value interface 253, the error numbers read from the registers of the PCIe switches 26, and the setting values on the transmission side of the PCIe switches 42 notified from the monitoring device 30, and records the associated information in the PCIe switch setting value determination table 257.

Such management information is not to be managed in association with the data in a table form, and the management information may be appropriately modified.

In the setting value determination function, an n×n continuous rectangular area (non-error area) (n is an odd number) in which the error is not detected (error number=0) is searched for in the setting value matrix 100a by referring to the PCIe switch setting value determination table 257.

In the non-error area, the error is not detected in the transmission and reception of the test pattern of the setting values at all the setting values (combinations of DFEs and CTLEs) constituting the areas.

In the setting value determination function, the combination of the DFE and the CTLE equivalent to a central location of the rectangular area is determined as the setting value.

In the example illustrated in FIG. 2A, the non-error area in 5×5 (n=5) is illustrated in the setting value matrix 100a (see reference sign P1). The combination of the DFE and the CTLE equivalent to the central location (see reference sign P2) is selected as the setting value.

Similarly, the setting value is also determined on the transmission side.

As depicted in FIG. 2B, the setting value matrix 100b is constituted by combinations of a plurality of gradually changing preshoot values (parameters) and a plurality of gradually changing de-emphasis values (parameters). That is, in the setting value matrix 100b illustrated in FIG. 2B, individual squares constituted by the combinations of the de-emphasis values arranged in the horizontal direction and the preshoot values arranged in the vertical direction respectively represent the setting values.

In the setting value matrix 100b, a pitch width of the de-emphasis in the horizontal direction and a pitch width of the preshoot in the vertical direction may be appropriately modified.

The setting value matrix 100b illustrated in FIG. 2B is constituted by arranging 15 types of de-emphasis values in the horizontal direction in ascending order and arranging 15 types of preshoot values in the vertical direction in ascending order, as a lower left location with an origin.

The preshoot is an equalizer that adjusts an amplitude level at a falling edge of an output signal. The de-emphasis is an equalizer that adjusts an amplitude level at a rising edge of an output signal.

On the transmission side, the waveform is adjusted by adjusting the parameters of the preshoot and the e-emphasis. The combination of the preshoot and the de-emphasis is used as the setting value (waveform adjustment value).

As depicted in FIG. 2B, in the present storage device 1, the plurality of types of preshoot values and the plurality of types of de-emphasis values are arranged in a matrix shape. In the setting value determination function, the combination of the preshoot and the de-emphasis is selected as the setting value from the matrix.

Specifically, in the communication path test function, the combinations of the preshoots and the de-emphasises represented in the matrix shape depicted in FIG. 2B are set as the actual setting values for the PCIe switch 26. The communication path test for actually receiving the test pattern in advance is performed.

If the error occurs at the time of the data transmission, the PCIe switch 26 stores the result (error number; error information) in a register (not illustrated).

If there is an area (non-error area) in which all the setting values constituting a 7×7 rectangular area (first determination area) of seven squares in the vertical direction×seven squares in the horizontal direction satisfy error number=0, as the non-error setting value group in the setting value matrix when the setting value determination function is realized, it is assumed that the monitoring device 25 sets the middle value as the setting value.

In a case where there is no first determination area in which all the setting values constituting the area of the 7×7 squares satisfy error number=0 in the setting value matrix, if there is an area in which all the setting values constituting a 5×5 rectangular area (second determination area) of five squares in the vertical direction×five squares in the horizontal directions satisfy error number=0, as the non-error setting value group, it is assumed that the monitoring device 25 sets the middle value as the setting value.

As stated above, in a case where the first determination area is not able to be detected in the setting value matrices 100a and 100b, it is possible to increase a detection probability of the determination area by searching for a second determination area smaller than the first determination area.

Hereinafter, reference numerals 100a and 100b are used as reference numerals indicating the setting value matrices when one of the plurality of setting value matrices is to be specified. However, reference numeral 100 is used when an arbitrary setting value matrix is indicated.

Figure 3:
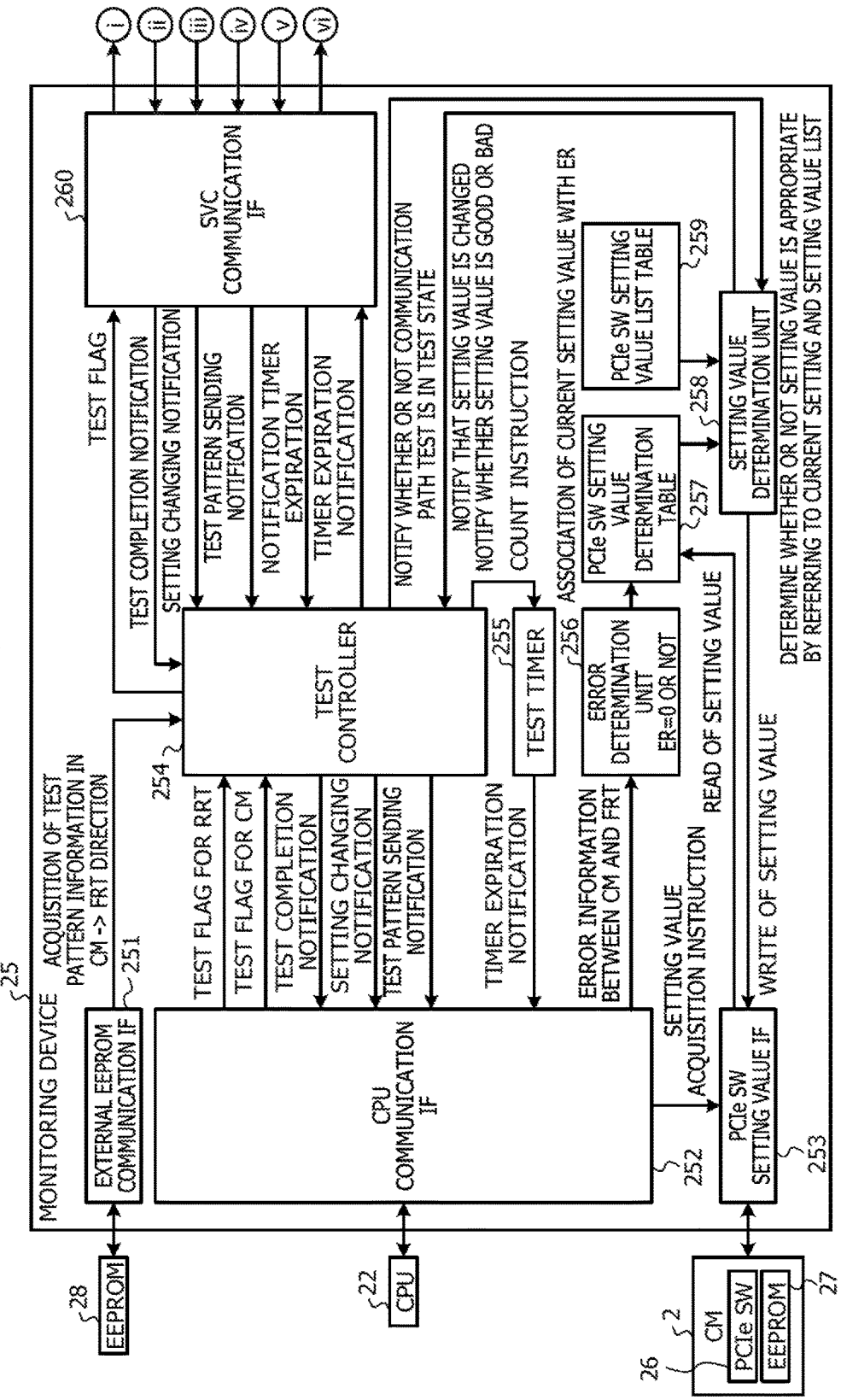
FIG. 3 is a diagram illustrating an example of a functional configuration of a monitoring device of a CM of the storage device.
Figure 4:
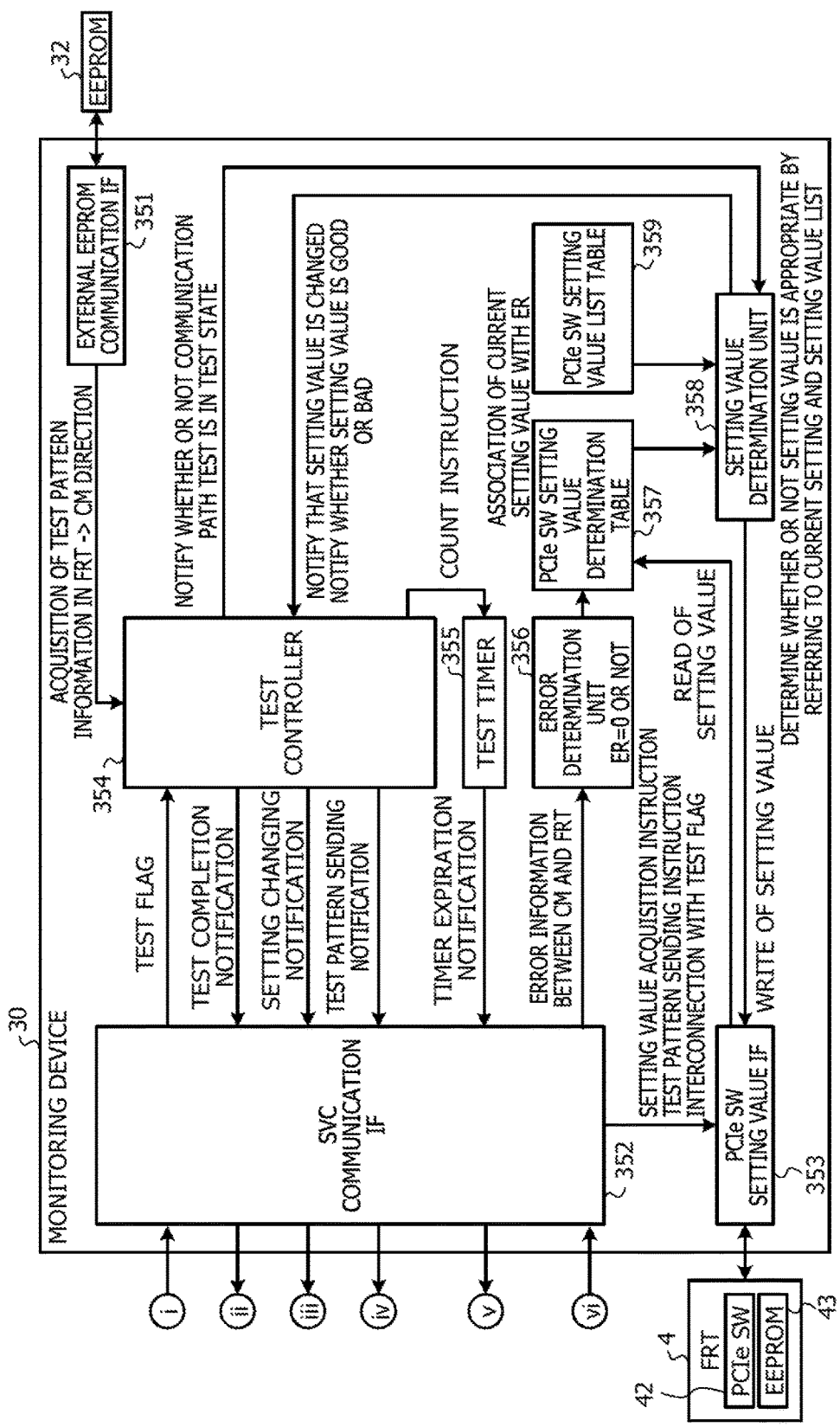
FIG. 4 is a diagram illustrating an example of a functional configuration of a monitoring device of an SVC of the storage device.

FIG. 3 is a diagram illustrating an example of a functional configuration of the monitoring device 25 of the CM 2 of the storage device 1, and FIG. 4 is a diagram illustrating an example of a functional configuration of the monitoring device 30 of the SVC 3.

In FIGS. 3 and 4, signals delivered between the respective functional components are depicted by arrows. However, for the sake of convenience, the delivery of some signals will not be illustrated.

In the example illustrated in FIG. 3, the monitoring device 25 has functions of an external EEPROM communication interface (IF) 251, a CPU communication interface (IF) 252, the PCIe switch (SW) setting value interface (IF) 253, a PCIe switch (SW) setting value interface (IF) 253, the test controller 254, a test timer 255, an error determination unit 256, the PCIe switch (SW) setting value determination table 257, the setting value determination unit 258, a PCIe switch (SW) setting value list table 259, and an SVC communication interface (IF) 260.

The external EEPROM communication interface 251 communicates with the external EEPROM 28. The external EEPROM communication interface 251 acquires the test data transmitted from the CM 2 to the FRT 4 from the EEPROM 28, and transfers the acquired test data to the test controller 254.

The SVC communication interface 260 performs data communication with the SVC 3. The SVC communication interface 260 transmits a test flag output from the test controller 254 or error information between the CM and the FRT to the SVC 3 through the monitoring interface cable 70 (see reference signs i and vi of FIGS. 3 and 4).

The SVC communication interface 260 receives a test completion notification, a setting changing notification, a test pattern sending notification, and a timer expiration notification output from the SVC 3 through the monitoring interface cable 70, and inputs the received notifications to the test controller 254 (see reference signs ii, iii, iv, and v of FIGS. 3 and 4).

The test completion notification and the like output from the test controller 254 are transmitted to the monitoring device 30 of the SVC 3 through the SVC communication interface 260.

The test timer 255 counts time. The test timer 255 starts to count time according to a time count instruction (count instruction) from the test controller 254. The test timer 255 transmits the timer expiration notification to the CPU communication interface 252 in a case where it is detected that a predetermined time (for example, 10 minutes) elapses.

The test controller 254 performs various control tasks for performing the communication path test regarding the data transmission from the CM 2 to the FRT 4.

For example, the test controller 254 reads the test pattern (CM→FRT) from the EEPROM 28 through the external EEPROM communication interface 251 (acquisition of test pattern information in the CM→FRT direction).

The test controller 254 transmits an instruction (test pattern sending notification) to send the test pattern to the FRT 4, to the CPU 22. That is, the test controller 254 controls the sending of the test pattern from the CM 2 to the FRT 4.

The test controller 254 transmits the setting value changing notification for instructing to change the setting value to the CPU 22 of the CM 2 and the monitoring device 30 of the SVC 3.

The CM 2 and the SVC 3 that receives the setting value changing notification changes the setting value of the PCIe switch 26 or the PCIe switch 42 to another value based on a setting value matrix 100 to be described below.

The setting value changing notification is input to the test controller 254 from the SVC 3 through the SVC communication interface 260.

If the setting value changing notification is input, the setting value determination unit 258 to be described below changes the setting value of the PCIe switch 26 based on the PCIe switch setting value determination table 257.

The test pattern sending notification is input to the test controller 254 from the SVC 3 through the SVC communication interface 260. If the test pattern sending notification is input, the test controller 254 starts the communication path test. That is, the test pattern read from the external EEPROM 28 is sent through the PCIe switch 26.

The test controller 254 outputs the test flag indicating that the communication path test is being performed to the SVC 3 through the SVC communication interface 260 while the communication path test is being performed.

If the communication path test is completed, the test controller 254 transmits the notification (test completion notification) indicating that the communication path test is completed to the CPU 22 of the CM 2 and the monitoring device 30 of the SVC 3.

For example, if a predetermined test pattern sending time (for example, 10 minutes) elapses after the sending of the test pattern is started, the test controller 254 transmits the test completion notification to the CPU 22 of the CM 2 and the monitoring device 30 of the SVC 3.

The CM 2 or the SVC 3 that receives the test completion notification acquires the error information stored in the register of the PCIe switch 26 or the PCIe switch 42, and transmits the acquired error information to the monitoring device 25 as a transmission source of the test completion notification.

The timer expiration notification is input to the test controller 254 from the SVC 3 through the SVC communication interface 260.

The timer expiration notification is sent from the monitoring device 30 of the SVC 3 to the monitoring device 25 of the CM 2 in a case where an elapsed time (test pattern sending time) after the sending of the test pattern in the FRT→CM direction is started exceeds a predetermined time (for example 10 minutes).

The test controller 254 outputs the count instruction to the test timer 255 in the communication path test.

The test controller 254 notifies the setting value determination unit 258 whether or not the communication path test is being performed (in a test state).

The test controller 254 transmits the instruction (test pattern sending notification) to send the test pattern to the FRT 4, to the CPU 22. The test controller 254 transmits the test pattern sending notification to the CPU 22 through the CPU communication interface 252.

That is, the test controller 254 controls the sending of the test pattern from the CM 2 to the FRT 4.

The test controller 254 transmits the instruction (test pattern sending notification) to send the test pattern to the CM 2, to the monitoring device 30 of the SVC 3. The test controller 254 transmits the test pattern sending notification to the SVC 3 through the SVC communication interface 260.

That is, the test controller 254 controls the sending of the test pattern from the CM 2 to the FRT 4.

The test controller 254 transmits the error number in the sending of the test pattern from the CM 2 to the FRT 4, from the register of each PCIe switch 42 included in each FRT 4 to the SVC 3 through the SVC communication interface 260 (error information between the CM and the FRT).

The test controller 254 collects the communication result (error number) in the sending of the test pattern from the FRT 4 to the CM 2 to be described below.

That is, the test controller 254 reads the error number of the test pattern transmitted from the FRT 4 to the CM 2 from the register of each PCIe switch 26 of the CM 2 (hereinafter, may be referred to as a host CM 2) in which the test controller is provided into the CPU 22 through the CPU communication interface 252.

The test controller 254 has a function of notifying the setting value determination unit 258 whether or not the communication path test is being performed (in a test state). For example, the test controller 254 sets a flag indicating whether or not the communication path test is being performed for a predetermined storage area such as a register (not illustrated). Accordingly, the test controller 254 notifies the setting value determination unit 258 whether or not the communication path test is being performed (notifies whether or not the communication path test is in the test state).

The test controller 254 notifies the CPU 22 the notification (setting changing notification) for instructing to change the setting value of the PCIe switch 26. The test controller 254 notifies the monitoring device 30 of the SVC 3 of the notification (setting changing notification) for instructing to change the setting value of the PCIe switch 42.

The CPU 22 that receives the setting changing notification changes the setting value of the PCIe switch 26 stored in the EEPROM 27 based on setting parameter information stored in the PCIe switch setting value list table 259.

The monitoring device 30 that receives the setting changing notification changes the setting value of the PCIe switch 42 stored in the EEPROM 43 based on the setting parameter information stored in the PCIe switch setting value list table 259.

The notification indicating that the setting value of the PCIe switch 26 stored in the EEPROM 27 is changed is input to the test controller 254 from the setting value determination unit 258 to be described below.

The result of the determination of whether the setting value is good or bad, which is performed by the setting value determination unit 258 is input to the test controller 254 (notification indicating whether the setting value is good or bad).

The notification indicating that the communication path test is completed is input to the test controller 254 from the SVC 3 through the SVC communication interface 260 (test completion notification).

The notification indicating that the setting value is changed in the PCIe switch 42 of the FRT 4 is input to the test controller 254 from the SVC 3 through the SVC communication interface 260 (setting changing notification).

The notification indicating that the test pattern is sent to the CM 2 from the FRT 4 is input to the test controller 254 from the SVC 3 through the SVC communication interface 260 (test pattern sending notification).

The timer expiration notification is input to the test controller 254 from the SVC 3 through the SVC communication interface 260 in a case where a test timer 304 detects that a predetermined time (for example, 10 minutes) elapses.

If the communication path test is completed, the test controller 254 notifies the CPU 22 of the CM 2 and the SVC 3 of the notification (test completion notification) indicating that the communication path test is completed through the CPU communication interface 252 and the SVC communication interface 260. The test completion notification is transmitted, and thus, the performing of the next process, that is, the error check function is started.

For example, if a predetermined time (for example, 10 minutes) elapses after the sending of the test pattern is started in the communication path test, the test controller 254 transmits the test completion notification to the monitoring device 30 of the SVC 3 or the CPU 22. The CPU 22 or the monitoring device 30 that receives the test completion notification acquires the error information from the register of the PCIe switch 26 or the PCIe switch 42, and notifies the monitoring device 25 of the acquired error information.

A test flag (test flag for FRT or test flag for CM) for notifying of a communication path test (process) being currently performed is input to the test controller 254. For example, in a case where the communication path test of the FRT 4 is performed, the test flag for FRT is input. In a case where the communication path test of the CM 2 is performed, the test flag for CM is input. The test controller 254 stores the input test flag value in a predetermined storage area such as a register (not illustrated).

The test controller 254 notifies the monitoring device 30 of the SVC 3 of information (error number) of errors detected in the reception of the test pattern in the communication path test of the FRT→CM direction.

The test controller 254 reads the information of errors (error information; error number in the present embodiment) from the register of each PCIe switch 26 through the CPU communication interface 252. The test controller 254 transmits the error information to the SVC 3 through the SVC communication interface 260 (error information between the CM and the FRT).

The CPU communication interface 252 communicates with the CPU 22. For example, the CPU communication interface 252 causes the CPU 22 to acquire the error numbers of the PCIe switches 26 and 42.

The CPU 22 reads the error number of the test pattern transmitted from the FRT 4 to the CM 2 from the register of each PCIe switch 26 of the CM 2 (hereinafter, may be referred to as a host CM 2) in which this CPU is provided.

The CPU communication interface 252 notifies the test controller 254 and the error determination unit 256 of the information (error information between the CM and the FRT) of errors acquired by the CPU 22.

If the test completion notification is received from the test controller 254, the CPU communication interface 252 transmits the test completion notification to the CPU 22.

If the setting changing notification is received from the test controller 254, the CPU communication interface 252 transmits the setting changing notification to the CPU 22.

If the test pattern sending notification is received from the test controller 254, the CPU communication interface 252 transmits the test pattern sending notification to the CPU 22.

The CPU communication interface 252 notifies the PCIe switch setting value interface 253 of an instruction (setting value acquisition instruction) to read a current setting value set for each PCIe switch 26 from each EEPROM 27 of the CM 2, and acquires the setting value.

The PCIe switch setting value interface 253 reads or rewrites the setting value stored in the EEPROM 27.

For example, the PCIe switch setting value interface 253 reads a current setting value (transmission side or reception side) from the EEPROM 27. The read current setting value of the PCIe switch 26 is stored in the PCIe switch setting value determination table 257. If the setting value acquisition instruction is input from the CPU communication interface 252, the PCIe switch setting value interface 253 reads the setting value from the EEPROM 27.

The PCIe switch setting value interface 253 rewrites the setting value stored in the EEPROM 27 by storing the setting value determined by the setting value determination unit 258 in the EEPROM 27.

In order to reflect the setting value stored in the EEPROM 27 on the PCIe switch 26, the PCIe switch setting value interface 253 reactivates (resets) the PCIe switch 26. For example, the resetting of the PCIe switch 26 may be performed according to an instruction command indicating the resetting of the PCIe switch 26. Alternatively, the resetting may be performed by inputting a predetermined signal to a reset terminal (not illustrated) provided at the PCIe switch 26. As stated above, the present embodiment may be variously modified.

The error determination unit 256 determines whether or not the error numbers read from the PCIe switches 26 and 42 are 0. The error determination unit 256 stores the result (whether or not the error number is 0: information indicating any one of 0 or Not) of the determination in association with the setting value (current setting value) at this point of time in the PCIe switch setting value determination table 257.

Accordingly, the PCIe switch setting value determination table 257 associates the setting value with the error number (whether or not the error number is 0).

As illustrated in FIGS. 2A and 2B, the PCIe switch setting value list table 259 manages all the setting values (setting value matrix 100 and the setting parameter information) that may be set in the storage device 1. In the present embodiment, an example in which the PCIe switch setting value list table 259 manages the setting values as the table is illustrated.

That is, the PCIe switch setting value list table 259 manages the setting values represented in the matrix shape in FIGS. 2A and 2B, as the table.

For example, in the setting value determination function, the setting values set for the PCIe switch 26 are sequentially switched by referring to the PCIe switch setting value list table 259.

The setting value determination unit 258 determines the setting values for the PCIe switch 26. The setting value determination unit 258 searches for the n×n continuous rectangular non-error area (n is preferably an odd integer) constituted by the setting values at which there is no error (error number=0) in the setting value matrix 100*b* by referring to the PCIe switch setting value determination table 257.

The setting value determination unit 258 determines the setting value (middle value) located in the middle of the non-error area, as the setting value set for the PCIe switch 26.

For example, in the example illustrated in FIG. 2B, a non-error area in 5×5 (n=5) is depicted in the setting value matrix 100*b* (see reference sign P3). The combination of the preshoot and the de-emphasis equivalent to the central location (see reference sign P4) is selected as the setting value on the transmission side.

Similarly, for example, in the example illustrated in FIG. 2A, a non-error area in 5×5 (n=5) is depicted in the setting value matrix 100*a* (see reference sign P1). The combination of the DFE and the CTLE equivalent to the central location (see reference sign P2) is selected as the setting value on the reception side.

The external EEPROM communication interface 251, the SVC communication interface 260, the test controller 254, the test timer 255, the PCIe switch setting value interface 253, and the setting value determination unit 258 realize the above-described communication path test function.

The SVC communication interface 260, the error determination unit 256, the PCIe switch setting value determination table 257, the PCIe switch setting value list table 259, and the setting value determination unit 258 realize the above-described error check function.

The PCIe switch setting value determination table 257, the PCIe switch setting value list table 259, the PCIe switch setting value interface 253, and the setting value determination unit 258 realize the setting value determination function.

The PCIe switch setting value determination table 257 and the PCIe switch setting value list table 259 are stored in a storage device (not illustrated) such as a memory.

For example, the monitoring device 25 includes a microprocessing unit (MPU), a processor such as a CPU, or a field programmable gate array (FPGA) (all not illustrated). The functions of the external EEPROM communication interface 251, the CPU communication interface 252, the PCIe switch setting value interface 253, the test controller 254, the test timer 255, the error determination unit 256, the setting value determination unit 258, and the SVC communication interface 260 are realized by the processor or the FPGA.

The functions of the respective units may be realized by any one of software or hardware.

For example, although not illustrated, a processor (not illustrated) executes programs stored in a memory (not illustrated), and thus, the processor functions as the error determination unit 256, the external EEPROM communication interface 251, the CPU communication interface 252, the PCIe switch setting value interface 253, the test controller 254, the test timer 255, the setting value determination unit 258, and the SVC communication interface 260.

For example, the programs (control programs) for realizing the functions of the error determination unit 256, the external EEPROM communication interface 251, the CPU communication interface 252, the PCIe switch setting value interface 253, the test controller 254, the test timer 255, the setting value determination unit 258, and the SVC communication interface 260 are provided by being recorded in a computer-readable recording medium such as a flexible disk, a CD (CD-ROM, CD-R, or CD-RW), a DVD (DVD-ROM, DVD-RAM, DVD-R, DVD+R, DVD-RW, DVD+RW, or HD DVD), Blu-ray disc, a magnetic disk, an optical disc, or a magneto-optical disc. A computer reads the program from the recording medium, transmits the read program to an internal storage device or an external storage device, stores the transmitted program, and uses the stored program. Alternatively, the program may be recorded in the storage device (recording medium) such as the magnetic disk, the optical disc, or the magneto-optical disc, and may be provided to the computer through the communication path from the storage device.

When the processor realizes the functions of the error determination unit 256, the external EEPROM communication interface 251, the CPU communication interface 252, the PCIe switch setting value interface 253, the test controller 254, the test timer 255, the setting value determination unit 258, and the SVC communication interface 260, the programs stored in the internal storage device (memory of the monitoring device 25 in the present embodiment) are executed by a microprocessor (processor in the present embodiment) of the computer. In this case, the computer may read the program recorded in the recording medium, and may execute the read program.

[3] SVC

The SVC 3 is a monitoring device that performs various monitoring tasks of the present storage device 1.

The SVC 3 also functions as a management device that manages communication between the CM 2 and the FRT 4. As will be described below, the SVC 3 sets the setting value for each PCIe switch 42 of the FRT 4 in cooperation with the CM 2.

As illustrated in FIG. 1, the SVC 3 includes the monitoring device 30 and the plurality (two connectors are illustrated in the example of FIG. 1) of connectors (CNs) 31. A connector (not illustrated) of one end of the monitoring interface cable 70 is detachably mounted on the connector 31. A connector (not illustrated) of the other end of the monitoring interface cable 70 is mounted on the connector (CN) 24 provided at the CM 2. Accordingly, the SVC 3 is communicatively connected to the CMs 2 through the monitoring interface cable 70, and monitors the CMs 2.

For the sake of convenience, two CMs 2 and two connectors 31 are illustrated in the example illustrated in FIG. 1. However, three or more (for example, 24) CMs 2 and connectors 31 may be provided, and the number of CMs or connectors may be variously modified.

The monitoring device 30 is connected to the PCIe switch 42 of each FRT 4 through the first data bus 90. The monitoring device 30 monitors the connection state of the communication cable 8 and the connector 41 of each FRT 4, or sets the setting value of each PCIe switch 42.

Similarly to the monitoring device 25, the monitoring device 30 realizes the setting value determination function of determining the setting value for the communication cable 8 connected to the present storage device 1.

When the setting value determination function is realized, the monitoring device 30 performs the communication path test for transmitting the test pattern data (test data) to the communication path via the communication cable 8.

In the communication path test, the monitoring device 30 accumulates the error log (error rate) by receiving the test pattern repeatedly transmitted from the CM 2 by the PCIe switch 42 in the communication path test in the CM→FRT direction.

The error log is also recorded and managed together with the setting values of the PCIe switch 26 and the PCIe switch 42 used in the transmission and reception of the test pattern in the monitoring device 30.

As mentioned above, in a case where the communication path test in the transmission direction (FRT→CM) of the data from the FRT 4 to the CM 2 is performed, the monitoring device 30 repeatedly transmits the test pattern while changing the setting value on the transmission side of the PCIe switch 42.

Specifically, the monitoring device 30 sequentially sets the setting values represented by the matrix (setting value matrix 100b) of setting values illustrated in FIG. 2B for the PCIe switch 42, and transmits the test pattern. As stated above, the monitoring device 30 has the communication path test function.

As mentioned above, in a case where the communication path test in the transmission direction (CM→FRT) of the data from the CM 2 to the FRT 4 is performed, the monitoring device 30 repeatedly receives the test pattern while changing the setting value on the reception side of the PCIe switch 42.

Specifically, the monitoring device 30 sequentially sets the setting values represented by the matrix (setting value matrix 100a) of setting values illustrated in FIG. 2A for the PCIe switch 42, and receives the test pattern.

The monitoring device 30 has the error check function of checking the error numbers of errors detected in the PCIe switch 26 and the PCIe switch 42, as the result of the communication path test.

As stated above, the monitoring device 25 of the CM 2 notifies the monitoring device 30 of the error number detected when the PCIe switch 26 receives the test pattern in the communication path test together with the setting value set for the reception side of the PCIe switch 26.

The monitoring device 25 notifies the monitoring device 30 of the setting value of the PCIe switch 26 used when the PCIe switch 26 transmits the test pattern in the communication path test.

As for the communication path test in the transmission direction (FRT→CM) of the data from the FRT 4 to the CM 2, the monitoring device 30 associates the error number and the setting value on the transmission side set for the PCIe switch 42 with the setting value on the reception side of the PCIe switch 26 notified from the monitoring device 25, and records the associated information as error management information in a PCIe switch setting value determination table 357 to be described below.

As for the communication path test in the transmission direction (CM→FRT) of the data from the CM 2 to the FRT 4, the monitoring device 30 associates with the setting value on the reception side set for the PCIe switch 42 and the detected error number with the setting value on the transmission side of the PCIe switch 26 notified from the monitoring device 25, and records the associated information in the PCIe switch setting value determination table 357.

As stated above, similarly to the monitoring device 25 of the CM 2, the monitoring device 30 has a function (communication path test log collection function) of associating the combinations of the PCIe switches 26 and the PCIe switches 42 constituting a target communication path of the communication path test with the combinations of the sequentially changing setting values on the transmission side and setting values on the reception side and recording the error numbers detected on the transmission and reception of the test pattern.

The monitoring device 30 specifies a predetermined range (non-error setting value group) in which the setting values having no error are continued from the matrix (setting value matrix: see FIGS. 2A and 2B) of setting values. The monitoring device 30 selects the value (middle value) in the middle of the non-error setting value group, as the setting value. That is, the monitoring device 25 has a setting value determination function of determining the setting value.

That is, similarly to the monitoring device 25 of the CM 2, the monitoring device 30 realizes the setting value determination function of determining the setting value for the communication cable 8 connected to the present storage device 1.

When such a setting value determination function is realized, the monitoring device 30 performs the communication path test for transmitting the test pattern (test data) to the communication path via the communication cable 8.

The monitoring device 30 determines the setting value for the communication cable 8 based on the result of the communication path test. The monitoring device 30 has the same configuration as that of the above-described monitoring device 25.

In the example illustrated in FIG. 4, the monitoring device 30 has functions of an external EEPROM communication interface (IF) 351, an SVC communication interface (IF) 352, a PCIe switch (SW) setting value interface (IF) 353, a test controller 354, a test timer 355, an error determination unit 356, a PCIe switch (SW) setting value determination table 357, a setting value determination unit 358, and a PCIe switch (SW) setting value list table 359.

If the error occurs at the time of the data reception, the PCIe switch 42 stores the result (error number; error information) in a register (not illustrated).

In the error check function of the present storage device 1, the error numbers as the results of the communication path test are collected from the registers of the PCIe switch 26 and the PCIe switch 42, whether or not the errors occur (error numbers) at the setting values is determined, and the error numbers are registered in the PCIe switch setting value determination table 357 to be described below.

The PCIe switch setting value determination table 357 is management information (error management information) managed by associating the error number detected in the setting value at the time of the transmission of the test pattern in the communication path test with the setting values constituting the setting value matrix. The PCIe switch setting value determination table 357 has the same configuration as that of the PCIe switch setting value determination table 257.

Such management information does not is to be managed in association with the data in a table form, and the management information may be appropriately modified.

For example, the monitoring device 25 of the CM 2 may transmits the creased PCIe switch setting value determination table 257 to the monitoring device 30, or the monitoring device 30 may retain the PCIe switch setting value determination table 257 acquired from the monitoring device 25, as the PCIe switch setting value determination table 357.

For example, the monitoring device 30 of the SVC 3 may transmit the created PCIe switch setting value determination table 357 to the monitoring device 25, and the monitoring device 25 may retain the PCIe switch setting value determination table 357 acquired from the monitoring device 30, as the PCIe switch setting value determination table 257.

In the setting value determination function, the n×n continuous rectangular area (non-error area) (n is preferably an odd integer) constituted by the setting values at which the error is not detected (error number=0) is seared for from the setting value matrix 100a by referring to the PCIe switch setting value determination table 357.

In the setting value determination function, the setting value (middle value) located in the middle of the rectangular area is determined as the setting value set for the PCIe switch 42.

As depicted in FIG. 2B, the present storage device 1 arranges the plurality of types of preshoot values and the plurality of types of de-emphasis values in a matrix shape, and selects the combination of the preshoot and the de-emphasis to be used as the setting value from the matrix in the setting value determination function.

Specifically, in the communication path test function, the combinations of the preshoots and the de-emphasises represented in the matrix shape depicted in FIG. 2B are actually set as setting values for the PCIe switch 42, and the communication path test for actually receiving the test pattern in advance is performed.

If the error occurs at the time of the data reception from the CM 2 or at the time of the data transmission to the CM 2, the PCIe switch 42 stores the result (error number; error information) in the register (not illustrated).

If there is an area (non-error area) in which all the setting values constituting a 5×5 rectangular area (first determination area) of five squares in the vertical direction×five squares in the horizontal direction satisfy error number=0, as the non-error setting value group in the setting value matrix when the setting value determination function is realized, the monitoring device 30 sets the middle value thereof as the setting value.

In a case where there is no first determination area in which all the setting values constituting the area of the 5×5 squares satisfy error number=0 in the setting value matrix, if there is an area in which all the setting values constituting a 3×3 rectangular area (second determination area) of three squares in the vertical direction×three squares in the horizontal directions satisfy error number=0, as the non-error setting value group, it is assumed that the monitoring device 30 sets the middle value as the setting value.

In the example illustrated in FIG. 4, the monitoring device 30 has the functions of the external EEPROM communication interface 351, the SVC communication interface 352, the PCIe switch setting value interface 353, the test controller 354, the test timer 355, the error determination unit 356, the PCIe switch (SW) setting value determination table 357, the setting value determination unit 358, and the PCIe switch setting value list table 359.

The external EEPROM communication interface 351 communicates with an external EEPROM 32. The external EEPROM communication interface 351 acquires the test data transmitted from the FRT 4 to the CM 2 from the EEPROM 32, and transfers the acquired test data to the test controller 354.

The SVC communication interface 352 performs data communication with the CM 2. The SVC communication interface 352 receives the error information between the CM and the FRT or the test flag transmitted from the CM 2 through the monitoring interface cable 70 (see reference signs i and vi of FIGS. 3 and 4). The received test flag or error information between the CM and the FRT is input to the test controller 354.

The SVC communication interface 352 transmits the test completion notification, the setting changing notification, the test pattern sending notification, and the timer expiration notification which are output from the test controller 354 to the CM 2 through the monitoring interface cable 70 (see reference signs ii, iii, iv, and v of FIGS. 3 and 4).

The test completion notification and the like transmitted from the test controller 254 of the CM 2 are received by the SVC communication interface 352 in the monitoring device 30 of the SVC 3.

The test timer 355 counts time. The test timer 355 starts to count the time according to a count instruction from the test controller 354, and transmits the timer expiration notification to the SVC communication interface 352 in a case where it is detected that a predetermined time (for example, 10 minutes) elapses.

The test controller 354 performs various control tasks for performing the communication path test regarding the data transmission from the FRT 4 to the CM 2.

For example, the test controller 354 reads the test pattern (FRT→CM) from the EEPROM 32 through the external EEPROM communication interface 351 (acquisition of the test pattern information in the FRT→CM direction).

The test controller 354 transmits an instruction (test pattern sending instruction or test pattern sending notification) to send the test pattern to the CM 2, to the FRT 4 through the SVC communication interface 352 and the PCIe switch setting value interface 353. That is, the test controller 354 controls the sending of the test pattern to the CM 2 from the FRT 4.

The FRT 4 starts the communication path test in response to the test pattern sending notification. That is, the test pattern read from the external EEPROM 43 is sent to the CM 2 through the PCIe switch 42.

The test controller 354 transmits the setting value changing notification for instructing to change the setting value to the monitoring device 25 of the CM 2.

The CM 2 that receives the setting value changing notification changes the setting value of the PCIe switch 26 to another value based on the setting value matrix 100.

The test controller 354 outputs the setting value changing notification to the CM 2 through the SVC communication interface 352.

The setting value changing notification is input to the test controller 354 from the CM 2 through the SVC communication interface 352.

If the setting value changing notification is input, the setting value determination unit 358 changes the setting value of the PCIe switch 42 based on the PCIe switch setting value determination table 357.

The test controller 354 outputs the test pattern sending notification to the CM 2 through the SVC communication interface 352.

The test controller 354 outputs the test flag indicating that the communication path test is being performed to the CM2 through the SVC communication interface 352 while the communication path test is being performed (the test pattern is being transmitted).

The test flag indication that the communication path test is being performed is input to the test controller 354 through the SVC communication interface 352 while the communication path test is being performed (the test pattern is being received).

If the communication path test is completed, the test controller 354 transmits the notification (test completion notification) indicating that the communication path test is completed to the CPU 22 of the CM 2.

For example, if a predetermined test pattern sending time (for example, 10 minutes) elapses after the sending of the test pattern is started, the test controller 354 transmits the test completion notification to the CM 2 through the SVC communication interface 352.

The CM 2 that receives the test completion notification acquires the error information stored in the register of the PCIe switch 26 or the PCIe switch 42, and transmits the acquired error information to the monitoring device 25 as a transmission source of the test completion notification.

If the communication path test from the FRT 4 to the CM 2 is completed, the test controller 354 outputs the notification (test completion notification) indicating that the communication path test is completed to the CM 2 through the SVC communication interface 352.

The timer expiration notification is input to the test controller 354 from the SVC 3 through the SVC communication interface 352.

The test controller 354 outputs the count instruction to the test timer 355 in the communication path test.

The test controller 354 notifies the setting value determination unit 358 whether or not the communication path test is being performed (in the test state).

The test controller 354 transmits the error number in the sending of the test pattern from the FRT 4 to the CM 2, from the register of each PCIe switch 26 to the CM 2 through the SVC communication interface 352 (error information between the CM and the FRT).

The test controller 354 collects the communication result (error number) in the sending of the test pattern from the FRT 4 to the CM 2.

That is, the test controller 354 reads the error number for the test pattern transmitted from the FRT 4 to the CM 2, from the register of each PCIe switch 26 of each CM 2 through the SVC communication interface 352.

The test controller 354 has a function of notifying the setting value determination unit 358 whether or not the communication path test is being performed (in the test state). For example, the test controller 354 notifies the setting value determination unit 358 whether or not the communication path test is being performed (notifies whether or not the communication path test is in the test state) by setting the flag indicating whether or not the communication path test is being performed for a predetermined storage area (not illustrated) such as a register.

The notification (setting changing notification) for instructing to change the setting value of the PCIe switch 42 is notified to the test controller 354 from the CM 2.

In the monitoring device 30 that receives the setting changing notification, the setting value determination unit 358 changes the setting value of the PCIe switch 42 stored in the EEPROM 43 based on the setting parameter information stored in the PCIe switch setting value list table 359.

The notification indicating that the setting value of the PCIe switch 42 stored in the EEPROM 43 is changed is input to the test controller 354 from the setting value determination unit 358 to be described below.

The test controller 354 receives the result of the determination of whether the setting value is good or bad, which is performed by the setting value determination unit 358 (notification indicating whether the setting value is good or bad).

The test controller 354 outputs the notification (test completion notification) indicating that the communication path test is completed to the CM 2 through the SVC communication interface 352.

The test controller 354 outputs the notification indicating that the setting value is changed in the PCIe switch 42 of the FRT 4 to the CM 2 through the SVC communication interface 352 (setting changing notification).

The test controller 354 outputs the notification indicating that the test pattern is sent to the CM 2 from the FRT 4, to the CM 2 through the SVC communication interface 352 (test pattern sending notification).

In a case where it is detected that the test timer 304 detects that a predetermined time (for example, 10 minutes) elapses, the timer expiration notification is input to the CM 2 through the SVC communication interface 352, and the timer expiration notification is input to the test controller 254.

If the communication path test is completed, the test controller 354 notifies the CPU 22 of the CM 2 of the notification (test completion notification) indicating that the communication path test is completed through the SVC communication interface 352. The test completion notification is transmitted, and thus, the performing of the next process, that is, the error check function is started.

For example, if a predetermined time (for example, 10 minutes) elapses after the sending of the test pattern is started in the communication path test, the test controller 354 transmits the test completion notification to the monitoring device 30 of the SVC 3. The CPU 22 of the CM 2 that receives the test completion notification acquires the error information from the register of the PCIe switch 26, and notifies the error determination unit 356 of the acquired error information.

If the communication path test from the FRT 4 to the CM 2 is completed, the PCIe switch setting value interface 353 acquires the error information from the register of the PCIe switch 42, and notifies the error determination unit 356 of the acquired error information.

The test flag for notifying of a communication path test (process) being currently performed is input to the test controller 354. The test controller 354 stores the input test flag value in a predetermined storage area (not illustrated) such as a register.

The test controller 354 notifies the monitoring device 25 of the CM 2 of the information (error information; error number in the present embodiment) of errors detected in the reception of the test pattern in the communication path test in the CM→FRT direction.

The test controller 354 reads the error number from the register of each PCIe switch 42, and transmits the read error number to the monitoring device 25 of the CM 2 through the SVC communication interface 352 (error information between the CM and the FRT).

The PCIe switch setting value interface 353 reads or rewrites the setting value stored in the EEPROM 43.

For example, the PCIe switch setting value interface 353 reads the current setting value from the EEPROM 43. The read current setting value of the PCIe switch 42 is stored in the PCIe switch setting value determination table 357. If the setting value acquisition instruction is input from the SVC communication interface 352, the PCIe switch setting value interface 353 reads the setting value from the EEPROM 43.

The PCIe switch setting value interface 353 rewrites the setting value stored in the EEPROM 43 by storing the setting value determined by the setting value determination unit 358 in the EEPROM 43.

In order to reflect the setting value stored in the EEPROM 43 on the PCIe switch 42, the PCIe switch setting value interface 353 reactivates (resets) the PCIe switch 42. For example, the resetting of the PCIe switch 42 may be performed according to an instruction command indicating the resetting of the PCIe switch 42. Alternatively, the resetting may be performed by inputting a predetermined signal to a reset terminal (not illustrated) provided at the PCIe switch 42, and may be variously modified.

The error determination unit 356 determines whether or not the error number read from the PCIe switch 26 or 42 is 0. The error determination unit 356 stores the result (whether or not the error number is 0: information indicating any one of 0 or Not) of the determination in association with the setting value (current setting value) at this point of time in the PCIe switch setting value determination table 357.

Accordingly, the PCIe switch setting value determination table 357 associates the setting value with the error number (whether or not the error number is 0).

Similarly to the PCIe switch setting value list table 259, the PCIe switch setting value list table 359 manages all the setting values (setting value matrix 100 or setting parameter information) that may be set in the present storage device 1 as illustrated in FIGS. 2A and 2B.

For example, in the setting value determination function, the setting values set for the PCIe switch 42 are sequentially switched by referring to the PCIe switch setting value list table 359.

The PCIe switch setting value list table 359 is the same as the PCIe switch setting value list table 259, and thus, the detailed description thereof will be omitted.

Similarly to the setting value determination unit 258, the setting value determination unit 358 determines the setting value set for the PCIe switch 42. The setting value determination unit 358 searches for the n×n continuous rectangular non-error area (n is preferably an odd integer) constituted by the setting values at which there is no error (error number=0) from the setting value matrix 100$b$ by referring to the PCIe switch setting value determination table 357.

The setting value determination unit 358 determines the setting value (middle value) located in the middle of the non-error area, as the setting value set for the PCIe switch 42.

The external EEPROM communication interface 351, the SVC communication interface 352, the test controller 354, the test timer 355, the PCIe switch setting value interface 353, and the setting value determination unit 358 realize the communication path test function.

The SVC communication interface 352, the error determination unit 356, the PCIe switch setting value determination table 357, the PCIe switch setting value list table 359, and the setting value determination unit 358 realize the above-described error check function.

The PCIe switch setting value determination table 357, the PCIe switch setting value list table 359, the PCIe switch setting value interface 353, and the setting value determination unit 358 realize the setting value determination function.

The PCIe switch setting value determination table 357 and the PCIe switch setting value list table 359 are stored in a storage device (not illustrated) such as a memory.

For example, the monitoring device 30 includes a microprocessing unit (MPU), a processor such as a CPU, or a field programmable gate array (FPGA) (all are not illustrated), and the functions of the external EEPROM communication interface 351, the SVC communication interface 352, the PCIe switch setting value interface 353, the test controller 354, the test timer 355, the error determination unit 356, and the setting value determination unit 358 are appropriately realized by the MPU or the FPGA.

The functions of the respective units may be realized by any one of software or hardware.

For example, although not illustrated, a processor (not illustrated) executes programs stored in a memory (not illustrated), and thus, the processor functions as the external EEPROM communication interface 351, the SVC communication interface 352, the PCIe switch setting value interface 353, the test controller 354, the test timer 355, the error determination unit 356, and the setting value determination unit 358.

For example, the programs (control programs) for realizing the functions of external EEPROM communication interface 351, the SVC communication interface 352, the PCIe switch setting value interface 353, the test controller 354, the test timer 355, the error determination unit 356, and the setting value determination unit 358 are provided by being recorded in a computer-readable recording medium such as a flexible disk, a CD (CD-ROM, CD-R, or CD-RW), a DVD (DVD-ROM, DVD-RAM, DVD-R, DVD+R, DVD-RW, DVD+RW, or HD DVD), Blu-ray disc, a magnetic disk, an optical disc, or a magneto-optical disc. A computer reads the program from the recording medium, transmits the read program to an internal storage device or an external storage device, stores the transmitted program, and uses the stored program. Alternatively, the program may be recorded in the storage device (recording medium) such as the magnetic disk, the optical disc, or the magneto-optical disc, and may be provided to the computer through the communication path from the storage device.

When the processors realizes the functions of the external EEPROM communication interface 351, the SVC communication interface 352, the PCIe switch setting value interface 353, the test controller 354, the test timer 355, the error determination unit 356, and the setting value determination unit 358, the programs stored in the internal storage device (memory of the monitoring device 30 in the present embodiment) are executed by a microprocessor (processor in the present embodiment) of the computer. In this case, the computer may read the program recorded in the recording medium, and may execute the read program.

(b) Operation

Figure 5:
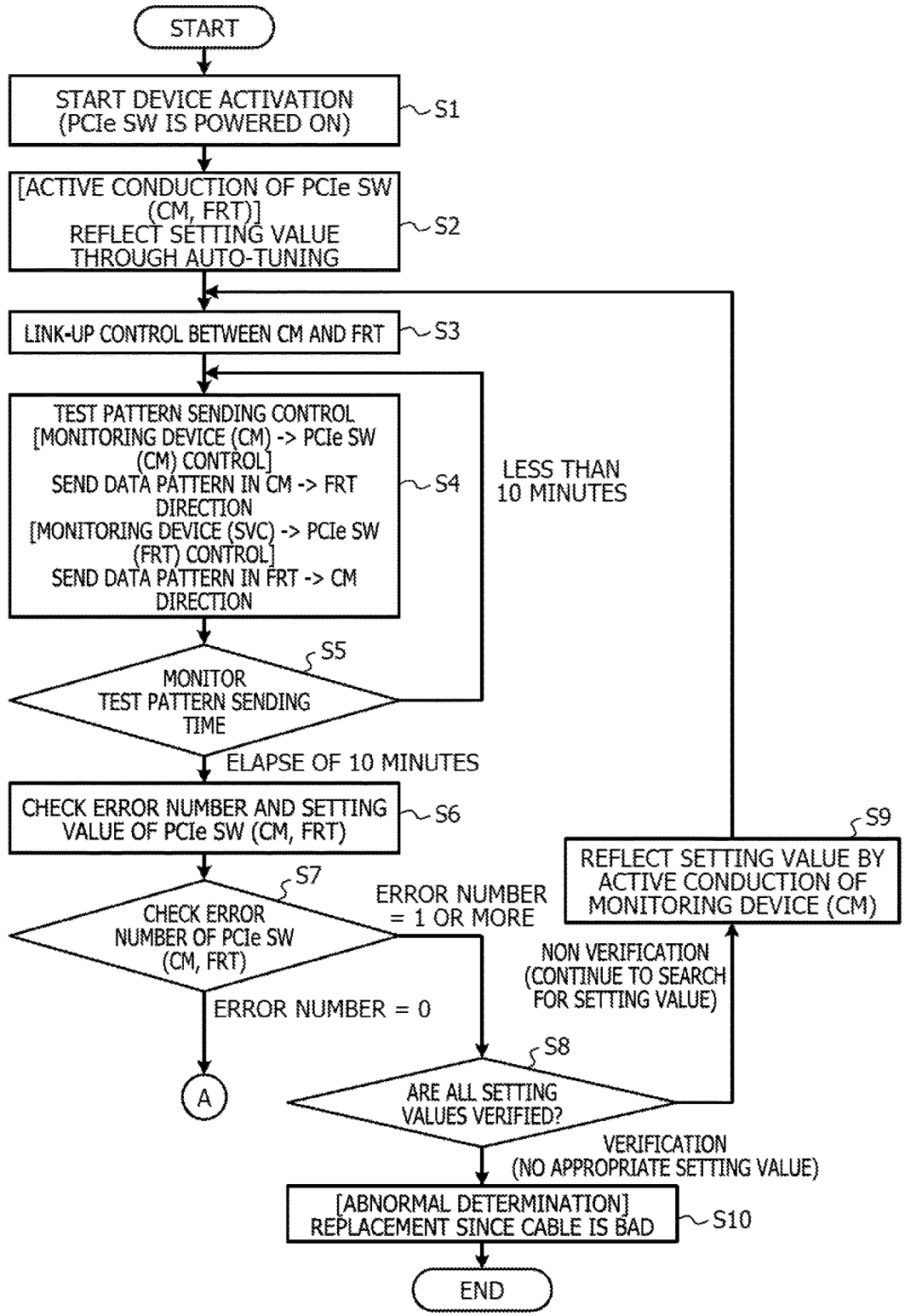
FIG. 5 is a flowchart for describing a setting method of a waveform setting value at the time of the device activation of the storage device.
Figure 6:
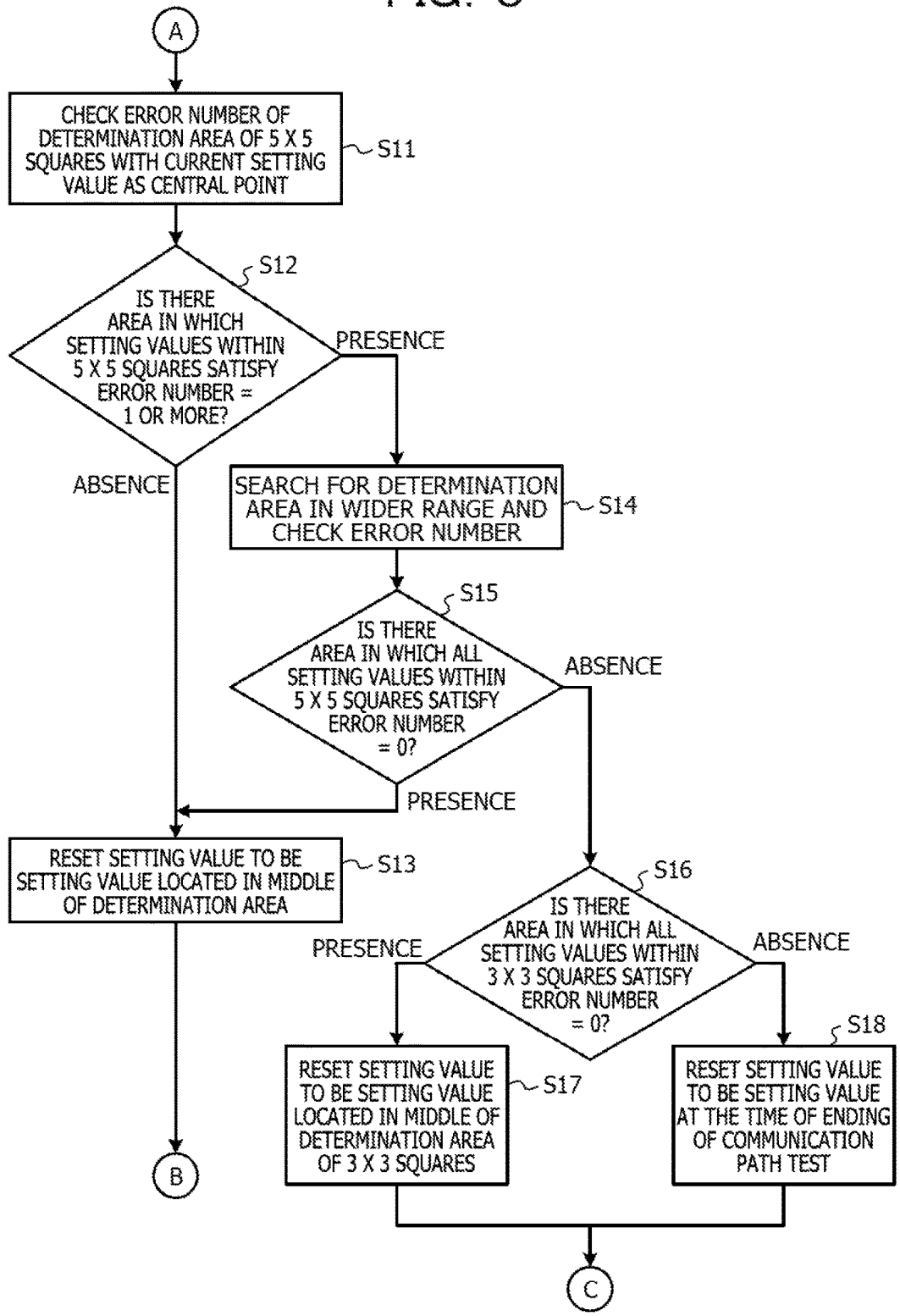
FIG. 6 is a flowchart for describing the setting method of the waveform setting value at the time of the device activation of the storage device.
Figure 7:
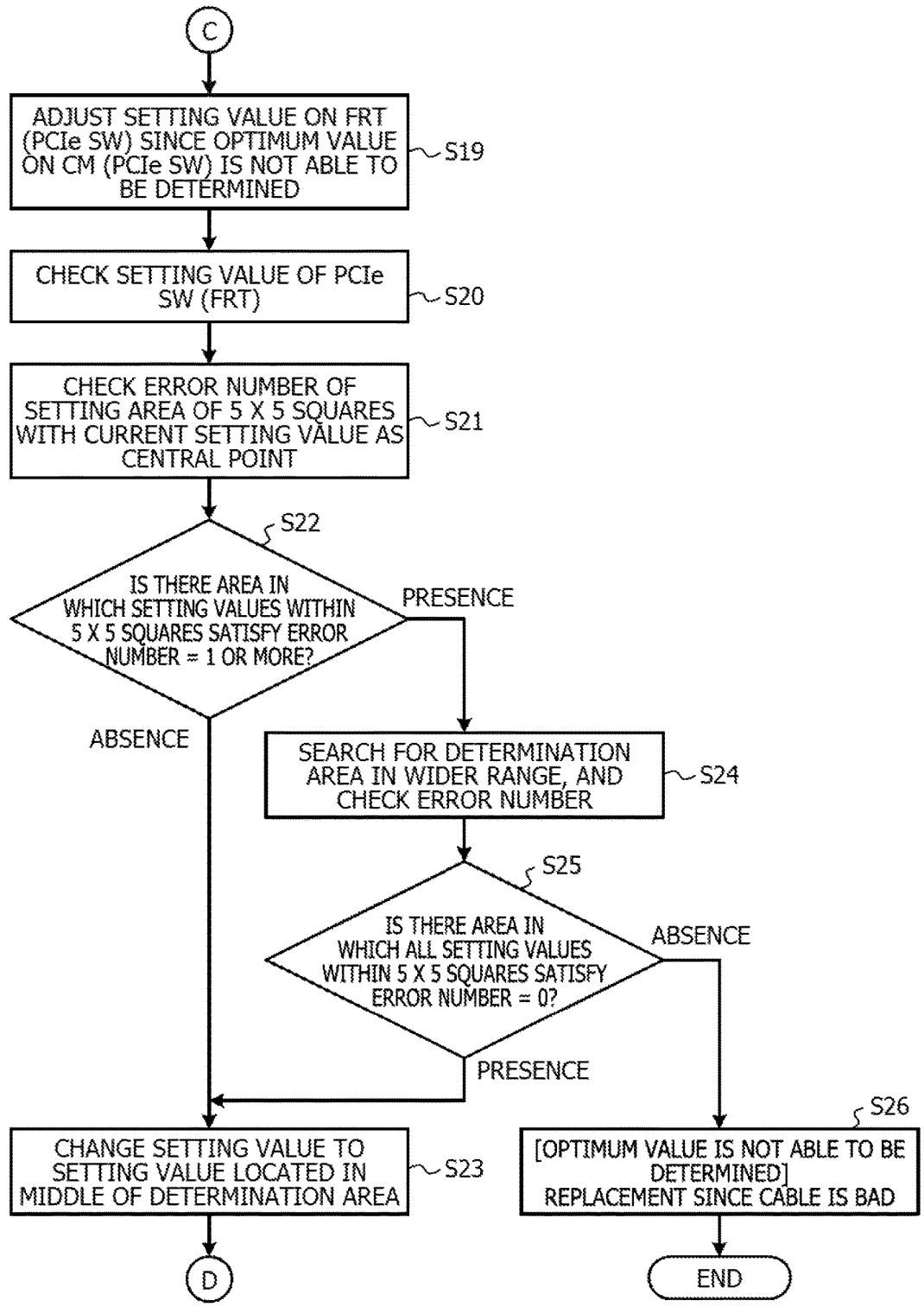
FIG. 7 is a flowchart for describing the setting method of the waveform setting value at the time of the device activation of the storage device.
Figure 8:
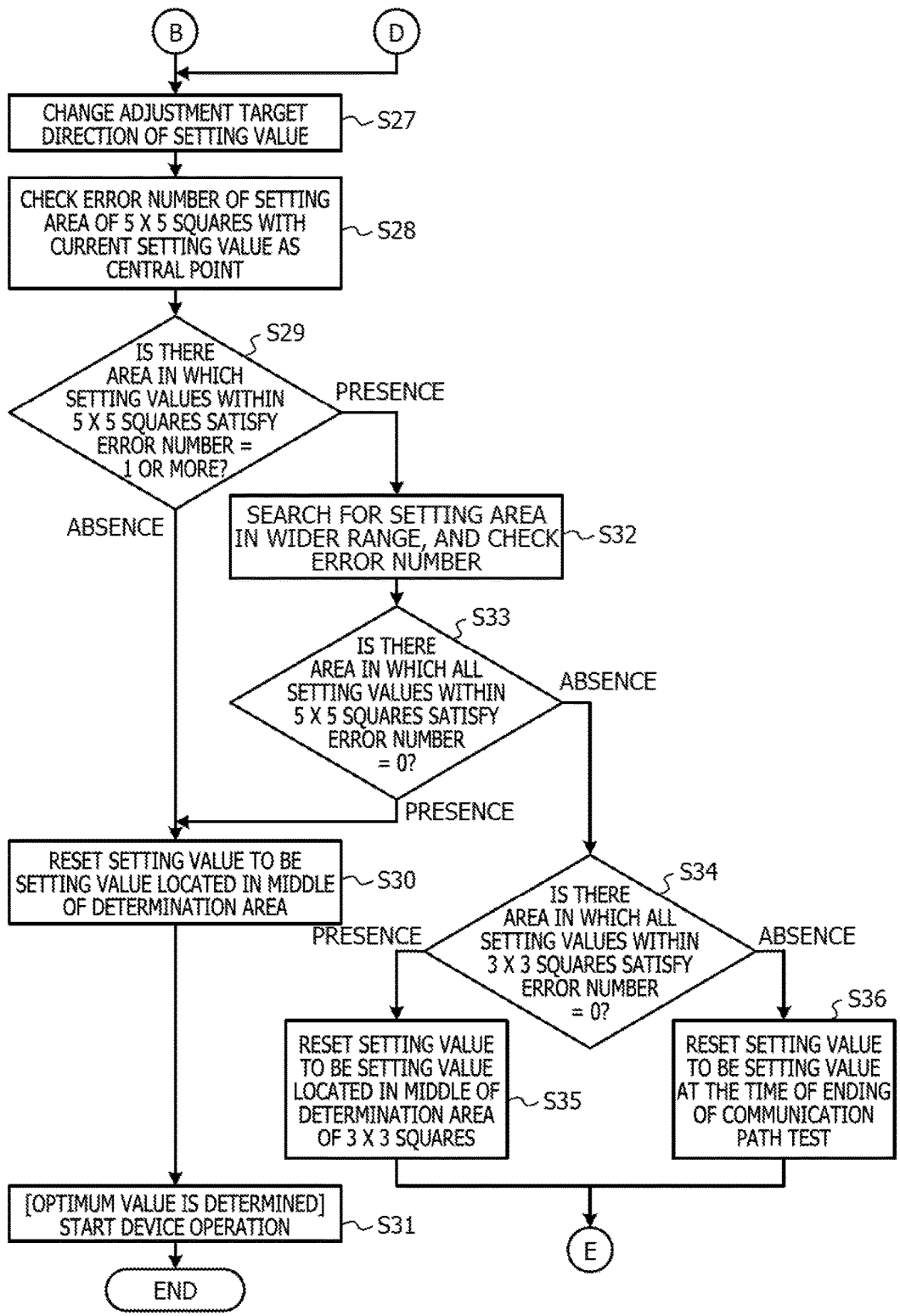
FIG. 8 is a flowchart for describing the setting method of the waveform setting value at the time of the device activation of the storage device.
Figure 9:
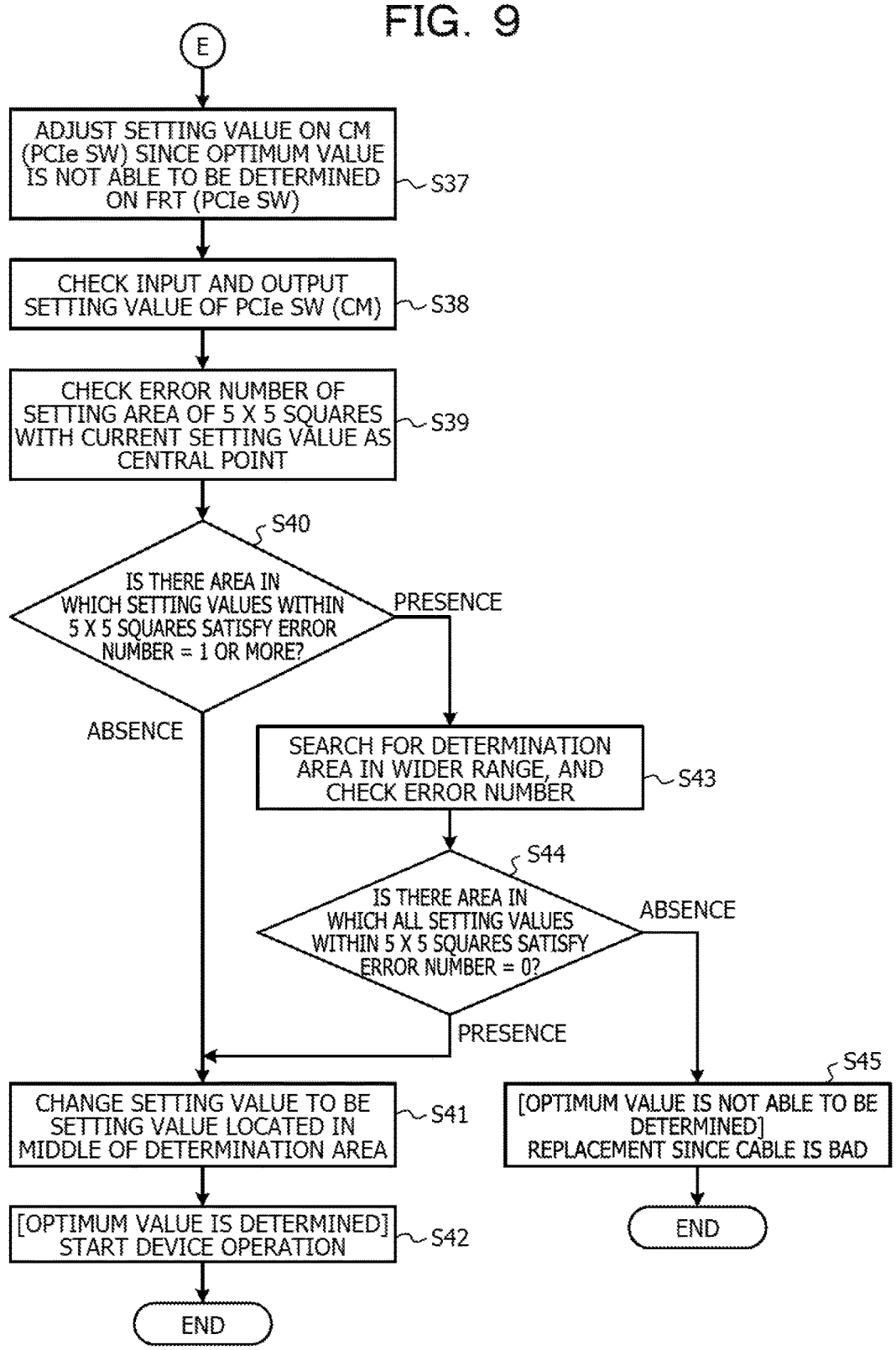
FIG. 9 is a flowchart for describing the setting method of the waveform setting value at the time of the device activation of the storage device.

As an example of the embodiment having the above-described configuration, a method of setting a waveform setting value at the time of the device activation of the storage device 1 will be described according to flowcharts (S1 to S45) illustrated in FIGS. 5 to 9. FIG. 5 illustrates S1 to S10, FIG. 6 illustrates S11 to S18, FIG. 7 illustrates S19 to S26, FIG. 8 illustrates S27 to S36, and FIG. 9 illustrates S37 to S45.

In the following processes, it is assumed that the CM 2 and the SVC 3 are able to already communicate with each other through the monitoring interface cable 70.

In S1, if the present storage device 1 is powered on, the CM 2, the SVC 3, and the FRT 4 are activated. That is, a power is supplied to the CM 2, the SVC 3, and the FRT 4, and each PCIe switch 26 of each CM 22 or each PCIe switch 42 of each FRT 4 is powered on.

In S2, each PCIe switch 26 of each CM 2 and each PCIe switch 42 of each FRT 4 set transmission parameters (setting values) by a known auto-tuning function.

Specifically, each PCIe switch 26 of each CM 2 and each PCIe switch 42 of each FRT 4 select values which are values falling within a prescribed value of the error number and are capable of being linked up by PCIe, as the setting values. The set setting values are respectively stored in the EEPROMs 27 and 43.

The setting of the setting values through the auto-tuning is preferably performed only at the time of the initial activation of the present storage device 1. In a case where the transmission setting values are already stored in the EEPROMs 27 and 43, the transmission setting values are used, and the process of S2 may be omitted. Accordingly, it is possible to decrease a time taken to set the setting values through the auto-tuning.

In S3, the monitoring device 25 of each CM 2 issues a link-up control instruction of the PCIe switch 26 or 42 to the monitoring device 30 of the SVC 3 and the CPU 22.

In S4, the monitoring device 25 of each CM 2 reads the test pattern stored in the EEPROM 28, and sends the test pattern in the CM→FRT direction to the FRT 4 from the CM 2.

The monitoring device 30 of the SVC 3 reads the test pattern stored in the EEPROM 32, and sends the test pattern in the FRT→CM direction to the CM 2 from the FRT 4.

With such a configuration, the communication path test is performed between the CM 2 and the FRT 4, and the test pattern is interactively sent.

In general, the PCIe switch has a test mode function of spontaneously sending the test pattern. However, in the test mode function, since data is simply looped back between the devices and whether or not the error occurs is determined only in sending source, the transmission path (direction) in which the error occurs is not able to be accurately determined.

In the present storage device 1, the test pattern previously stored in the external EEPROMs 27 and 43 is interactively sent.

In S5, the test controller 254 of the monitoring device 25 of each CM 2 activates the test timer 255, and starts to monitor the sending time (for example, 10 minutes) of the test pattern.

Similarly, the test controller 354 of the monitoring device 30 of the SVC 3 activates the test timer 355, and starts to monitor the sending time (for example, 10 minutes) of the test pattern.

Although it has been described in the present embodiment that the sending time of the test pattern is 10 minutes, the present embodiment is not limited thereto, and may be appropriately modified in consideration of a load of each unit of the present storage device 1.

In a case where the sending time (10 minutes) of the test pattern does not elapse (see a route of "less than 10 minutes" of S5), the process is returned to S4, and the transmission of the test pattern is continued. That is, the test pattern is repeatedly and interactively transmitted and received between the CM 2 and the FRT 4 until the sending time of the test pattern elapses.

If the sending time (10 minutes) of the test pattern elapses (see a route of "elapse of 10 minutes" of S5), the process proceeds to S6.

In S6, the test controller 254 of each CM 2 transmits the error information stored in the register of each PCIe switch 26 to the monitoring device 30 of the SVC 3 (error information between the CM and the FRT). In this case, the test controller 254 also transmits the setting value on the reception side of the PCIe switch 26 to the monitoring device 30.

The test controller 354 of the SVC 3 transmits the error information stored in the register of each PCIe switch 42 of each FRT 4 to the monitoring device 25 of the CM 2 as the communication partner of each PCIe switch 42 (error information between the CM and the FRT). In this case, the test controller 354 also transmits the setting value on the reception side of the PCIe switch 42 to the monitoring device 25.

As for the communication path test in the FRT→CM direction, the monitoring device 25 of each CM 2 collects the error number detected by the error determination unit 256 in the communication path test, and reads the setting value on the reception side from the EEPROM 27 of each PCIe switch 26 through the PCIe switch setting value interface 253. The setting value on the transmission side of the PCIe switch 42 used in the transmission of the test pattern is transmitted from the monitoring device 30 of the SVC 3.

As for each PCIe switch 26, the monitoring device 25 registers the setting value on the transmission side and the setting value on the reception side and the error numbers detected in the communication path test performed using the setting values in the PCIe switch setting value determination table 257.

In the communication path test in the CM→FRT direction, the monitoring device 25 of each CM 2 reads the setting value on the transmission side from the EEPROM 27 of each PCIe switch 26 through the PCIe switch setting value interface 253. The error number detected in the communication path test read from the PCIe switch 42 and the setting value on the reception side of the PCIe switch 42 used in the reception of the test pattern are transmitted from the monitoring device 30 of the SVC 3.

As for each PCIe switch 26, the monitoring device 25 registers the setting value on the transmission side and the setting value on the reception side and the error numbers detected in the communication path test performed using the setting values in the PCIe switch setting value determination table 257.

Similarly to the monitoring device 25 of the CM 2, the communication path test log is also collected in the monitoring device 30 of the SVC 3.

That is, in the communication path test in the CM→FRT direction, the monitoring device 30 collects the error number detected by the error determination unit 356 in the communication path test, and reads the setting value on the reception side from the EEPROM 27 of each PCIe switch 42 through the PCIe switch setting value interface 353. The setting value on the transmission side of the PCIe switch 26 used in the transmission of the test pattern is transmitted from the monitoring device 25 of the CM 2.

As for each PCIe switch 42, the monitoring device 30 registers the setting value on the transmission side and the setting value on the reception side and the error numbers detected in the communication path test performed using the setting values in the PCIe switch setting value determination table 357.

In the communication path test in the FRT→CM direction, the monitoring device 30 reads the setting value on the transmission side from the EEPROM 43 of each PCIe switch 42 through the PCIe switch setting value interface 353. The error number detected in the communication path test read from the PCIe switch 26 and the setting value on the reception side of the PCIe switch 26 used in the reception of the test pattern are transmitted from the monitoring device 25 of the CM 2.

As for each PCIe switch 42, the monitoring device 30 registers the setting value on the transmission side and the setting value on the reception side and the error numbers detected in the communication path test performed using the setting values in the PCIe switch setting value determination table 357.

In S7, the setting value determination unit 258 of the CM 2 determines whether the setting value is good or bad based on the error number detected in the communication path test for the PCIe switches 26 and 42. That is, the setting value determination unit 258 checks the error number of each PCIe switch 26 of the CM 2 and the error number of each PCIe switch 42 of the FRT 4 in the result being acquired by performing the communication path test using the setting value being current set.

As the checking result, the processes subsequent to S8 of FIG. 5 are performed on the PCIe switches 26 and 42 in which the error number is 1 or more (see a route of "error number=1 or more" of FIG. 7).

In S8, the setting value determination unit 258 checks whether or not the error number is checked (verified) through the communication path test for all the setting values of the setting value matrix 100.

That is, in the communication path test in the CM→FRT direction, all the setting values constituting the setting value matrix 100*b* are sequentially set for the PCIe switch 26, and the setting values constituting the setting value matrix 100*a* are sequentially set for the PCIe switch 42. The test pattern is transmitted using all the combinations thereof a predetermined number of times or more, and whether or not the error number is checked is checked.

Similarly, in the communication path test in the FRT→CM direction, all the setting values constituting the setting value matrix 100*a* are sequentially set for the PCIe switch 26, and the setting values constituting the setting value matrix 100*b* are sequentially set for the PCIe switch 42. The test pattern is transmitted using all the combinations thereof a predetermined number of times or more, and whether or not the error number is checked is checked.

The setting value selected from the setting value matrix 100*b* is set for the PCIe switch 26 or 42 on the transmission side, and the setting value selected from the setting value matrix 100*a* is used for the PCIe switch 26 or 42 on the reception side.

In the PCIe switches 26 and 42, in a case where the error number is verified for the combinations of all the setting values of the setting value matrix 100 on the transmission side and the reception side (see a route of "verification" of S8), there is no appropriate setting value for the PCIe switches 26 and 42. Thus, in S10 of FIG. 5, it is determined that the cable is bad (abnormal determination), and the communication cable 8 used in the connection of the PCIe switches 26 and 42 in which the error is detected is replaced since this communication cable is the bad cable.

For example, the monitoring device 25 instructs a system administrator to replace the cable by displaying a message indicating that the communication cable 8 is to be replaced on a display device (not illustrated), and ends the process.

In the PCIe switches 26 and 42, in a case where there is the setting value at which the error number is not verified for the combinations of all the setting values of the setting value matrix 100 on the transmission side and the reception side (see a route of "non verification" of S8), the process proceeds to S9 of FIG. 5.

In S9, the setting value determination unit 258 of the CM 2 selects the unverified setting values of the setting value matrix 100, and stores the selected setting values in the EEPROM 27 by the PCIe switch setting value interface 253.

The setting value determination unit 258 causes the PCIe switch setting value interface 253 to individually reactivate (reset) the PCIe switches 26, and reads the setting values stored in the EEPROM 27 into the PCIe switches 26.

The test controller 254 of the CM 2 notifies the monitoring device 30 of the SVC 3 of the selected setting values through the SVC communication interface 260, and sets the notified setting values for the PCIe switches 42 of the FRT 4.

In the monitoring device 30 of the SVC 3, the PCIe switch setting value interface 353 stores the unverified setting values of the setting value matrix 100 in the EEPROM 43. The PCIe switch setting value interface 353 initially reactivates (resets) the PCIe switch 26, and reads the setting values stored in the EEPROM 27 into the PCIe switches 26.

The setting value selected from the setting value matrix 100*b* is used for the PCIe switches 26 and 42 on the transmission side, and the setting value selected from the setting value matrix 100*a* is used for the PCIe switches 26 and 42 on the reception side.

After new setting values are reflected on the PCIe switches 26 and 42, the process is returned to S3.

As the checking result of S7, in a case where the error number is 0 (see a route of "error number=0" of S7), the process proceeds to S11 of FIG. 6. In this case, the setting values at which the error does not occur in the communication path test are selected for the PCIe switches 26 and 42.

In the present example, in the following processes of S11 to S15, the setting values on the CM 2 in the FRT→CM direction are initially set.

In S11, the setting value determination unit 258 acquires the setting values corresponding to the locations of the rectangular determination area (first determination area) of 25 squares in 5×5 which is acquired by extending the determination area by two squares in the vertical direction and the horizontal direction with the current setting value as its center in the setting value matrix 100.

The setting value determination unit 258 checks the error numbers of the communication path test at the setting values by referring to the PCIe switch setting value determination table 257.

In S12 of FIG. 6, the setting value determination unit 258 checks whether or not there is the setting value at which the error is detected in the communication path test one or more times among the setting values included in the first determination area.

As the checking result, in a case where there is no setting value that satisfies error number=1 or more in the first determination area (see a route of "absence" of S12), it is considered that the setting value (current setting value) currently set for the PCIe switch 26 is present in an optimum determination area.

In S13 of FIG. 6, the setting value determination unit 258 sets the setting value corresponding to the central location of the rectangular determination area of 25 squares in 5×5 constituting the above-described first determination area for the PCIe switch 26.

That is, the setting value determination unit 258 stores new setting value in the EEPROM 27 by the PCIe switch setting value interface 253, reactivates the PCIe switch 26, and reads the setting value stored in the EEPROM 27 into the PCIe switch 26.

In this manner, the setting value (current setting value) set for the PCIe switch 26 is a setting value at which it is verified that the error is not detected in the communication path test. The current setting value and another approximate setting value within the determination area in the setting value matrix 100 are also verified that the error is not detected in the communication path test. Accordingly, it is possible to acquire the same advantage as a case where safety factor is given to the setting value. Therefore, for example, even in a case where there is a variation in quality of the communication cable 8 or an environment condition such as temperature or voltage is changed, the transmission error is difficult to occur, and it is possible to improve communication quality.

Thereafter, the process proceeds to S27 of FIG. 8, and the setting value in the CM→FRT direction on the FRT 4 is set.

Meanwhile, as the checking result of S12, in a case where there is the setting value that satisfies error number=1 or more in the first determination area (see a route of "presence" of S12), the process proceeds to S14 of FIG. 6.

In S14, the setting value determination unit 258 checks the error number of the communication path test for the setting values constituting the setting value matrix 100 by referring to the PCIe switch setting value determination table 257 and the PCIe switch setting value list table 259.

In S15 of FIG. 6, the setting value determination unit 258 determines whether or not there is the area (first determination area) in which all the setting values corresponding to the locations of 25 continuous squares of five squares in the vertical direction×five squares in the horizontal direction satisfy error number=0 in the setting value matrix 100.

As the checking result of S15, in a case where there is the area (first determination area) in which all the setting values corresponding to the locations of 25 continuous squares of five squares in the vertical direction×five squares in the horizontal direction satisfy error number=0 in the setting value matrix 100 (see a route of "presence" of S15), the process proceeds to S13.

In S13, the setting value determination unit 258 sets the setting value corresponding to the central location of the rectangular determination area of 25 squares in 5×5 for the PCIe switch 26. Thereafter, the process proceeds to S27 o FIG. 8.

As the checking result of S15, in a case where there is no area (first determination area) in which all the setting values corresponding to the locations of 25 continuous squares in five squares in the vertical direction×five squares in the horizontal direction satisfy error number=0 in the setting value matrix 100 (see a route of "absence" of S15), the process proceeds to S16 of FIG. 6.

In S16, the setting value determination unit 258 determines whether or not there is the area (second determination area) in which all the setting values corresponding to the locations of nine continuous squares in three squares in the vertical direction and three squares in the horizontal direction satisfy error number=0 in the setting value matrix 100.

As the checking result of S16, in a case where there is the area in which all the setting values corresponding to the locations of nine continuous squares of three squares in the vertical direction and three squares in the horizontal direction satisfy error number=0 in the setting value matrix 100 (see a route of "presence" of S16), the process proceeds to S17 of FIG. 6.

In S17, the setting value determination unit 258 sets the setting value corresponding to the central location of the rectangular determination area of 25 squares in 5×5 for the PCIe switch 26. Thereafter, the process proceeds to S19 of FIG. 7.

As the checking result of S16, in a case where there is no area (second determination area) in which all the setting values corresponding to the locations of nine continuous squares of three squares in the vertical direction×three squares in the horizontal direction satisfy error number=0 in the setting value matrix 100 (see a route of "absence" of S16), the process proceeds to S18 of FIG. 6.

In S18, the setting value determination unit 258 sets the setting value in S6 described above for the PCIe switch 26. That is, the setting value is returned to the setting value when the communication path test is ended. Thereafter, the process proceeds to S19 of FIG. 7.

Since an optimum value of the setting value of the PCIe switch 26 on the CM 2 is not able to be determined, the setting value of the PCIe switch 42 on the FRT 4 is adjusted in S19.

In the following processes of S20 to S26, the setting value in the FRT→CM direction on the FRT 4 is set.

In S20 of FIG. 7, the monitoring device 30 of the SVC 3 checks the setting value of the PCIe switch 42. That is, the test controller 354 of the monitoring device 30 reads the setting value of the PCIe switch 42 from the EEPROM 43 of the FRT 4 into the PCIe switch setting value interface 353.

In S21 of FIG. 7, the setting value determination unit 358 acquires the setting values corresponding to the locations of the rectangular determination area (third determination area) of 25 squares in 5×5 which is acquired by extending the determination area by two squares in the vertical direction and the horizontal direction with the current setting value as its center in the setting value matrix 100.

The setting value determination unit 358 checks the error numbers of the communication path test at the setting values by referring to the PCIe switch setting value determination table 357.

In S22 of FIG. 7, the setting value determination unit 358 checks whether or not there is the setting value at which the error is detected in the communication path test one or more times among the setting values included in the third determination area of 5×5 squares.

As the checking result, in a case where there is no setting value that satisfies error number=1 or more in the third determination area (see a route of "absence" of S22), it is considered that the setting value (current setting value) currently set for the PCIe switch 42 is present in an optimum determination area.

In S23 of FIG. 7, the setting value determination unit 358 sets the setting value corresponding to the central location of the rectangular determination area of 25 squares in 5×5 described above for the PCIe switch 42.

That is, the setting value determination unit 358 stores a new setting value in the EEPROM 43 by the PCIe switch setting value interface 353, reactivates the PCIe switch 42, and reads the setting value stored in the EEPROM 43 into the PCIe switch 42.

In this manner, the setting value (current setting value) set for the PCIe switch 42 is a setting value at which it is verified that the error is not detected in the communication path test. The current setting value and another approximate setting value within the determination area in the setting value matrix 100 are also verified that the error is not detected in the communication path test. Accordingly, it is possible to acquire the same advantage as a case where safety factor is given to the setting value. Therefore, for example, even in a case where there is a variation in quality of the communication cable 8 or an environment condition such as temperature or voltage is changed, the transmission error is difficult to occur, and it is possible to improve communication quality.

Thereafter, the process proceeds to S27 of FIG. 8.

Meanwhile, as the checking result of S22, in a case where there is the setting value that satisfies error number=1 or more in surrounding setting values (see a route of "presence" of S22), the process proceeds to S24 of FIG. 7.

In S24, the setting value determination unit 358 checks the error number of the communication path test for the setting values constituting the setting value matrix 100 by referring to the PCIe switch setting value determination table 357 and the PCIe switch setting value list table 359.

In S25 of FIG. 7, the setting value determination unit 358 determines whether or not there is the area (third determination area) in which all the setting values corresponding to the locations of 25 continuous squares of five squares in the vertical direction×five squares in the horizontal direction satisfy error number=0 in the setting value matrix 100.

As the checking result of S25, in a case where there is the area (third determination area) in which all the setting values corresponding to the locations of 25 continuous squares of five squares in the vertical direction×five squares in the horizontal direction satisfy error number=0 in the setting value matrix 100 (see a route of "presence" of S25), the process proceeds to S23.

In S23, the setting value determination unit 358 sets the setting value corresponding to the central location of the rectangular determination area of 25 squares in 5×5 for the PCIe switch 42. Thereafter, the process proceeds to S27 o FIG. 8.

Meanwhile, as the checking result of S25, in a case where there is no area (third determination area) in which all the setting values corresponding to the locations of 25 continuous squares of five squares in the vertical direction×five squares in the horizontal direction satisfy error number=0 in the setting value matrix 100 (see a route of "absence" of S25), there is no appropriate setting value set for the PCIe switch 42.

That is, in S26 of FIG. 7, the determination (abnormal determination) that the cable is bad is performed, and the communication cable 8 used in the connection of the PCIe switch 42 in which the error is detected is replaced since this communication cable is the bad cable. Thereafter, the process is ended.

Thereafter, in S27 of FIG. 8, the transmission direction in which the setting value is adjusted is changed.

In the processes of S27 to S36, the setting value in the CM→FRT direction on the FRT 4 is set.

In S28 of FIG. 8, the setting value determination unit 358 acquires the setting values corresponding to the locations of the rectangular determination area (first determination area) of 25 squares in 5×5 which is acquired by extending the determination area by two squares in the vertical direction and the horizontal direction with the current setting value as its center in the setting value matrix 100.

The setting value determination unit 358 checks the error numbers of the communication path test at the setting values by referring to the PCIe switch setting value determination table 357.

In S29 of FIG. 8, the setting value determination unit 358 checks whether or not there is the setting value at which the error is detected in the communication path test one or more times among the setting values included in the first determination area.

As the checking result, in a case where there is no setting value satisfies error number=1 or more in the first determination area (see a route of "absence" of S29), it is considered that the setting value (current setting value) currently set for the PCIe switch 42 is present in an optimum determination area.

In S30 of FIG. 8, the setting value determination unit 358 sets the setting value corresponding to the central location of the rectangular determination area of 25 squares in 5×5 constituting the above-described first determination area for the PCIe switch 42.

That is, the setting value determination unit 358 stores a new setting value in the EEPROM 43 by the PCIe switch setting value interface 353, reactivates the PCIe switch 42, and reads the setting value stored in the EEPROM 43 into the PCIe switch 42.

In this manner, the setting value (current setting value) set for the PCIe switch 42 is a setting value at which it is verified that the error is not detected in the communication path test. The current setting value and another approximate setting value within the determination area in the setting value matrix 100 are also verified that the error is not detected in the communication path test. Accordingly, it is possible to acquire the same advantage as a case where safety factor is given to the setting value. For example, accordingly, even in a case where there is a variation in quality of the communication cable 8 or the transmission data includes noise, the transmission error is difficult to occur, and it is possible to improve communication quality.

Through the above-described processes, the optimum setting values are set for the PCIe switches 26 and 42, and the operation of the present storage device 1 is started (S31 of FIG. 8).

Meanwhile, as the checking result of S29, in a case where there is the setting value that satisfies error number=1 or more in the first determination area (see a route of "presence" of S29), the process proceeds to S32 of FIG. 8.

In S32, the setting value determination unit 358 checks the error number of the communication path test for the setting values constituting the setting value matrix 100 by referring to the PCIe switch setting value determination table 357 and the PCIe switch setting value list table 359.

In S33 of FIG. 8, the setting value determination unit 358 determines whether or not there is the area (first determination area) in which all the setting values corresponding to the locations of 25 continuous squares of five squares in the vertical direction×five squares in the horizontal direction satisfy error number=0 in the setting value matrix 100.

As the checking result of S33, In a case where there is the area (first determination area) in which all the setting values corresponding to the locations of 25 continuous squares of five squares in the vertical direction×five squares in the horizontal direction satisfy error number=0 in the setting value matrix 100 (see a route of "presence" of S33), the process proceeds to S30.

In S30, the setting value determination unit 358 sets the setting value corresponding to the central location of the rectangular determination area of 25 squares in 5×5 for the PCIe switch 42.

As the checking result of S33, in a case where there is no area (first determination area) in which all the setting values corresponding to the locations of 25 continuous squares of five squares in the vertical direction×five squares in the horizontal direction satisfy error number=0 in the setting value matrix 100 (see a route of "absence" of S33), the process proceeds to S34 of FIG. 6.

In S34, the setting value determination unit 358 determines whether or not there is the area (second determination area) in which all the setting values corresponding to the locations of nine continuous squares of three squares in the vertical direction×three squares in the horizontal direction satisfy error number=0 in the setting value matrix 100.

As the checking result of S34, in a case where there is the area in which all the setting values corresponding to the locations of nine continuous squares of three squares in the vertical direction×three squares in the horizontal direction satisfy error number=0 in the setting value matrix 100 (see a route of "presence" of S34), the process proceeds to S35 of FIG. 8.

In S35, the setting value determination unit 358 sets the setting value corresponding to the central location of the rectangular determination area of 25 squares in 5×5 for the PCIe switch 42. Thereafter, the process proceeds to S37 of FIG. 9.

As the checking result of S34, in a case where there is no area (second determination area) in which all the setting values corresponding to the locations of 25 continuous squares of three squares in the vertical direction×three squares in the horizontal direction satisfy error number=0 in the setting value matrix 100 (see a route of "absence" of S34), the process proceeds to S36 of FIG. 8.

In S36, the setting value determination unit 358 sets the setting value in S6 described above for the PCIe switch 42. That is, the setting value is returned to the setting value when the communication path test is ended. Thereafter, the process proceeds to S37 of FIG. 9.

Since the optimum value of the setting value of the PCIe switch 42 is not able to be determined on the FRT 4, the setting value of the PCIe switch 26 on the CM2 is adjusted in S37.

In the following processes of S38 to S45, the setting value in the CM→FRT direction is set on the CM 2.

In S38 of FIG. 9, the monitoring device 25 of the CM 2 checks the setting value of the PCIe switch 26. That is, the test controller 254 of the monitoring device 25 reads the setting value of the PCIe switch 26 from the EEPROM 27 of the CM 2 into the PCIe switch setting value interface 253.

In S39 of FIG. 9, the setting value determination unit 258 acquires the setting values corresponding to the locations of the rectangular determination area (third determination area) of 25 squares in 5×5 which is acquired by extending the determination area by two squares in the vertical direction and the horizontal direction with the current setting value as its center in the setting value matrix 100.

The setting value determination unit 258 checks the error numbers of the communication path test at the setting values by referring to the PCIe switch setting value determination table 257.

In S40 of FIG. 9, the setting value determination unit 258 checks whether or not there is the setting value at which the error is detected in the communication path test one or more times among the setting values included in the third determination area of 5×5 squares.

As the checking result, in a case where there is no setting value that satisfies error number=1 or more in the third determination area (see a route of "absence" of S40), it is considered that the setting value (current setting value) currently set for the PCIe switch 26 is present in an optimum determination area.

In S41 of FIG. 9, the setting value determination unit 258 sets the setting value corresponding to the central location of the rectangular determination area of 25 squares in 5×5 described above for the PCIe switch 26.

That is, the setting value determination unit 258 stores new setting value in the EEPROM 27 by the PCIe switch setting value interface 253, reactivates the PCIe switch 26, and reads the setting value stored in the EEPROM 27 into the PCIe switch 26.

In this manner, the setting value (current setting value) set for the PCIe switch 26 is a setting value at which it is verified that the error is not detected in the communication path test. The current setting value and another approximate setting value within the determination area in the setting value matrix 100 are also verified that the error is not detected in the communication path test. Accordingly, it is possible to acquire the same advantage as a case where safety factor is given to the setting value. For example, accordingly, even in a case where there is a variation in quality of the communication cable 8 or the transmission data includes noise, the transmission error is difficult to occur, and it is possible to improve communication quality.

Through the above-described processes, the optimum setting values are set for the PCIe switches 26 and 42, the operation of the present storage device 1 is started (S42 of FIG. 9), and the present process is ended.

Meanwhile, as the checking result of S40, in a case where there is the setting value that satisfies error number=1 or more in surrounding setting values (see a route of "presence" of S40), the process proceeds to S43 of FIG. 9.

In S43, the setting value determination unit 258 checks the error number of the communication path test for the setting values constituting the setting value matrix 100 by referring to the PCIe switch setting value determination table 257 and the PCIe switch setting value list table 259.

In S44 of FIG. 9, the setting value determination unit 258 determines whether or not there is the area (third determination area) in which all the setting values corresponding to the locations of 25 continuous squares of five squares in the vertical direction×five squares in the horizontal direction satisfy error number=0 in the setting value matrix 100.

As the checking result of S44, in a case where there is the area (first determination area) in which all the setting values corresponding to the locations of 25 continuous squares of five squares in the vertical direction×five squares in the horizontal direction satisfy error number=0 in the setting value matrix 100 (see a route of "presence" of S44), the process proceeds to S41.

In S41, the setting value determination unit 258 sets the setting value corresponding to the central location of the rectangular determination area of 25 squares in 5×5 for the PCIe switch 26. Thereafter, the process proceeds to S42.

Meanwhile, as the checking result of S44, in a case where there is no area (third determination area) in which all the setting values corresponding to the locations of 25 continuous squares of five squares in the vertical direction×five squares in the horizontal direction satisfy error number=0 in the setting value matrix 100 (see a route of "absence" of S44), there is no appropriate setting value set for the PCIe switch 26.

That is, in S45 of FIG. 9, the determination (abnormal determination) that the cable is bad is performed, and the communication cable 8 used in the connection of the PCIe switch 26 in which the error is detected is replaced since this communication cable is the bad cable. Thereafter, the process is ended.

(c) Advantages

As stated above, according to the storage device 1 as the example of the embodiment, the communication path test for transmitting and receiving the test pattern between the CM 2 and the FRT 4 is performed, the setting value at which the error is not detected in the communication path test is selected, and the selected setting value is set for the PCIe switches 26 and 42. Accordingly, the optimum setting value for the communication cable 8 can be set for the PCIe switches 26 and 42.

The optimum waveform setting value depending on the communication cable 8 to be used is autonomously set for the NT PCIe switches 26 and 42, and the communication can be performed with stable signal quality.

Even in a case where there is a variation in characteristics of the communication cable 8, since the optimum setting value appropriate for the inserted cable is set, it is possible to minimize influence of the variation of the characteristics of the communication cable 8, and it is possible to decrease a communication error.

The setting value determination units 258 and 358 search for the n×n continuous rectangular area (non-error area) (n is an odd number) constituted only by the setting values at which the error is not detected in the communication path test in the setting value matrix 100, and set the setting value of the central location for the PCIe switches 26 and 42.

Accordingly, it is possible to acquire the same advantages as a case where safety factor is given to the setting value set for the PCIe switches 26 and 42. For example, even in a case where there is a variation in quality of the communication cable 8 or the transmission data includes noise, the transmission error is difficult to occur. Accordingly, it is possible to improve the communication quality.

(d) Others

The disclosed technology is not limited to the above-described embodiment, and may be variously modified without departing from the gist of the present embodiment.

The components and processes of the present embodiment may be arbitrarily selected, or may be appropriately combined.

For example, the number of CMs 2 or the number of FRTs 4 included in the present storage device 1 are not limited to the above-described embodiment, and may be variously modified.

Similarly, the number of connectors 21 or PCIe switches 26 included in the CM 2 or the number of connectors 41 or PCIe switches 42 included in the FRT 4 are not limited to the above-described embodiment, and may be variously modified.

Although it has been described in the above-described embodiment that the communication cable 8 is the PCIe cable and the communication using PCIe is performed between the CM 2 and the FRT 4, the present embodiment is not limited thereto, and may be applied to communication using standards other than PCIe.

Although the example of the communication cable 8 that connects the CM 2 and the FRT 4 of the storage device 1 has been described in the above-described embodiment, the present embodiment is not limited thereto. For example, the present embodiment may be applied to a computer system in which a plurality of information processing devices is connected to each other, and may be variously modified.

Although it has been described in the above-described embodiment that the setting value matrix 100a acquired by combining the CTLEs and the DFEs as the transmission parameters or the setting value matrix 100b acquired by combining the de-emphasises and the preshoots as the transmission parameters is used as the waveform adjustment value, the present embodiment is not limited thereto.

Combinations of three or more types of transmission parameters may be used as the setting value matrix 100, and the setting value matrix may be variously modified.

Although it has been described in the above-described embodiment that the n×n rectangular area (non-error area) (n is preferably an odd integer) is used, the present embodiment is not limited thereto. For example, n may be an even number. An n×m rectangular area (m is an integer other than n) may be used in place of the n×n rectangular area.

In a case where n and m are even numbers, the selected setting value is not limited to the median of the rectangular area. For example, an average value of the setting values constituting the rectangular area may be used, and the setting value may be variously modified.

Although it has been described in the above-described embodiment that the error determination units 256 and 356 determine whether or not the error number is equal to or greater than 1 in the communication path test, the present embodiment is not limited thereto. For example, the determination may be performed based on an error occurrence rate, and may be variously modified.

The present embodiment may be performed and manufactured by those skilled in the art through the above-described disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A processing method executed by a processor included in a first communication device coupled to a second communication device, the processing method comprising:
outputting, from a first communication interface of the first communication device, a plurality of data items to a communication path between the first communication interface and a second communication interface of the second communication device while changing a communication setting value regarding the first communication interface;
acquiring error information related to the outputting of the plurality of data items;
storing the acquired error information as error management information acquired by associating the communication setting value with the error information;
specifying a predetermined number of continuous communication setting values at which an error is not detected based on the error management information;
setting a target setting value of the specified communication setting values for the first communication interface; and
executing a communication process between the first communication interface for which the target setting value is set and the second communication interface,
the communication setting value is expressed by combinations of parameter values of a plurality of types of transmission parameters, and
the changing of the communication setting value includes changing the communication setting value within a range of a matrix indicating the combinations.

2. The processing method according to claim 1,
wherein the communication setting values include a plurality of n×n continuous setting values (n is an odd integer) in the matrix indicating the combinations, and
the target setting value is a setting value located in a middle of the plurality of n×n setting values.

3. The processing method according to claim 1, wherein the outputting includes outputting the data items to each of the combinations a predetermined number of times or more.

4. The processing method according to claim 1, further comprising specifying a lower number of continuous communication setting values than the predetermined number at which the error is not detected when the predetermined number of communication setting values are not able to be specified based on the error management information.

5. The processing method according to claim 1, further comprising determining whether a communication cable used for the communication path is good or bad for all the combinations in a case where the error information indicates that the error is detected.

6. A communication system, comprising:
a first communication device that includes a first communication interface and a processor; and
a second communication device that includes a second communication interface,
the processor is configured to:
output, from the first communication interface, a plurality of data items to a communication path between the first communication interface and the second communication interface while changing a communication setting value regarding the first communication interface;
acquire error information related to outputting of the plurality of data items to the communication path;
store the acquired error information as error management information acquired by associating the communication setting value with the error information;
specify a predetermined number of continuous communication setting values at which an error is not detected based on the error management information;
set a target setting value of the specified communication setting values for the first communication interface; and
execute a communication process between the first communication interface for which the target setting value is set and the second communication interface,
the communication setting value is expressed by combinations of parameter values of a plurality of types of transmission parameters, and
the processor is configured to change the communication setting value within a range of a matrix indicating the combinations.

7. The communication system according to claim 6,
wherein the communication setting values include a plurality of n×n continuous setting values (n is an odd integer) in the matrix indicating the combinations, and
the target setting value is a setting value located in a middle of the plurality of n×n setting values.

8. The communication system according to claim 6, wherein the processor is configured to output the data items to each of the combinations a predetermined number of times or more.

9. The communication system according to claim 6, wherein the processor is configured to specify a lower number of continuous communication setting values than the predetermined number at which the error is not detected when the predetermined number of communication setting values are not able to be specified based on the error management information.

10. A non-transitory computer-readable recording medium storing a program that causes a processor included in a first communication device connected to a second communication device to execute a process, the process comprising:
outputting, from a first communication interface of the first communication device, a plurality of data items to a communication path between the first communication interface and a second communication interface of the second communication device while changing a communication setting value regarding the first communication interface;
acquiring error information related to the outputting of the plurality of data items;
storing the acquired error information as error management information acquired by associating the communication setting value with the error information;
specifying a predetermined number of continuous communication setting values at which an error is not detected based on the error management information;
setting a target setting value of the specified communication setting values for the first communication interface; and
executing a communication process between the first communication interface for which the target setting value is set and the second communication interface,
the communication setting value is expressed by combinations of parameter values of a plurality of types of transmission parameters, and the changing of the communication setting value includes changing the communication setting value within a range of a matrix indicating the combinations.

\* \* \* \* \*